(12) United States Patent
Itakura

(10) Patent No.: US 7,627,880 B2
(45) Date of Patent: Dec. 1, 2009

(54) CONTENTS PROVIDING SYSTEM AND METHOD, PROVIDING APPARATUS AND METHOD, REPRODUCTION APPARATUS AND METHOD, AND PROGRAM

(75) Inventor: Eisaburo Itakura, Kanagawa (JP)

(73) Assignee: Sony Corporation, Tokyo (JP)

( * ) Notice: Subject to any disclaimer, the term of this patent is extended or adjusted under 35 U.S.C. 154(b) by 715 days.

(21) Appl. No.: 10/929,575

(22) Filed: Aug. 31, 2004

(65) Prior Publication Data

US 2005/0120372 A1 Jun. 2, 2005

(30) Foreign Application Priority Data

Sep. 5, 2003 (JP) ............... 2003-313518

(51) Int. Cl.
*H04N 7/10* (2006.01)
(52) U.S. Cl. ............... 725/34; 725/12; 725/46; 725/47
(58) Field of Classification Search ............ 725/32, 725/34, 35, 46, 45, 10–12; 348/1, 7, 10, 348/12, 13; 715/745, 747
See application file for complete search history.

(56) References Cited

U.S. PATENT DOCUMENTS

| 5,977,964 | A * | 11/1999 | Williams et al. ............ 715/721 |
| 6,020,883 | A * | 2/2000 | Herz et al. ............ 715/721 |
| 6,342,925 | B1 * | 1/2002 | Akhavan et al. ............ 348/563 |
| 7,058,964 | B2 * | 6/2006 | Khandelwal et al. ............ 725/25 |
| 2003/0063222 | A1 * | 4/2003 | Creed et al. ............ 348/687 |
| 2004/0128301 | A1 * | 7/2004 | Thint et al. ............ 707/101 |
| 2004/0250272 | A1 * | 12/2004 | Durden et al. ............ 725/25 |
| 2007/0118475 | A1 * | 5/2007 | Picciallo et al. ............ 705/42 |

FOREIGN PATENT DOCUMENTS

| JP | 09-046689 | 2/1997 |
| JP | 2001-147944 | 5/2001 |
| JP | 2002-082977 | 3/2002 |
| JP | 2003-032660 | 1/2003 |
| JP | 2003-067414 | 3/2003 |

OTHER PUBLICATIONS

"Eye controlled Media: Present and Future State"; Arne John Glenstrup, Theo Engell-Nielsen; University of Copenhagen; Jun. 1, 1995.*

* cited by examiner

*Primary Examiner*—Andrew Y Koenig
*Assistant Examiner*—Junior O Mendoza
(74) *Attorney, Agent, or Firm*—Oblon, Spivak, McClelland, Maier & Neustadt, L.L.P.

(57) ABSTRACT

An apparatus and method is disclosed by which contents can be provided in accordance with the preference of a user. A selection control section of a contents providing apparatus selects sub contents conforming to a preference of a user from within a contents server based on static preference information of the user stored in a preference information storage section. A QoS controller adjusts the sub contents based on meta information included in the sub contents and transmits the adjusted sub contents to a user terminal apparatus through a sender section. The user terminal apparatus reproduces the sub contents and extracts and transmits dynamic preference information of the user for the reproduced sub contents to the contents providing apparatus. The QoS controller adjusts next sub contents based on the dynamic preference information and meta information included in the next sub contents. The invention can be applied to a system which provides contents.

16 Claims, 22 Drawing Sheets

| | ID | | PW | | | |
|---|---|---|---|---|---|---|
| | | PICTURE QUALITY | IMAGE PROCESS | SOUND QUALITY | CPU PROCESSING CAPACITY | COST |
| 411 { | SPORTS | A | MOTION PREFERENTIAL | NORMAL | HIGH | NORMAL |
| | HORROR | A | SHADED | LOW | HIGH | NORMAL |
| | NEWS | C | NO | HIGH | LOW | LOW |
| | PDA | C | LOW | LOW | LOW | LOW |
| 412 { | TV | B | MEDIUM | HIGH | MEDIUM | MEDIUM |
| | PC | A | HIGH | MEDIUM | HIGH | HIGH |

400

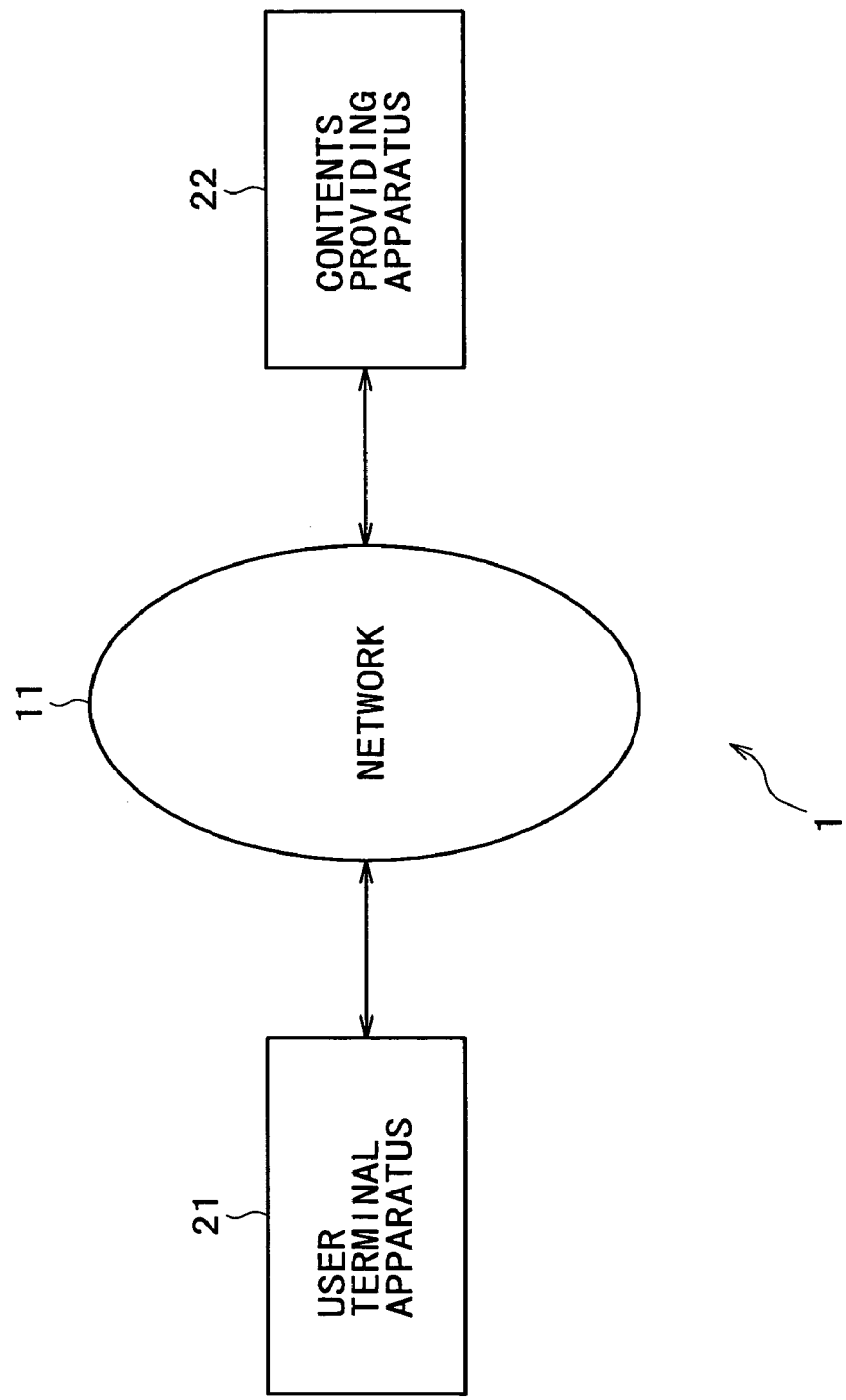

FIG. 8

| | ID | | PW | | |
|---|---|---|---|---|---|
| | PICTURE QUALITY | IMAGE PROCESS | SOUND QUALITY | CPU PROCESSING CAPACITY | COST |
| SPORTS | A | MOTION PREFERENTIAL | NORMAL | HIGH | NORMAL |
| HORROR | A | SHADED | LOW | HIGH | NORMAL |
| NEWS | C | NO | HIGH | LOW | LOW |
| PDA | C | LOW | LOW | LOW | LOW |
| TV | B | MEDIUM | HIGH | MEDIUM | MEDIUM |
| PC | A | HIGH | MEDIUM | HIGH | HIGH |

400

411, 412

F I G. 1 9
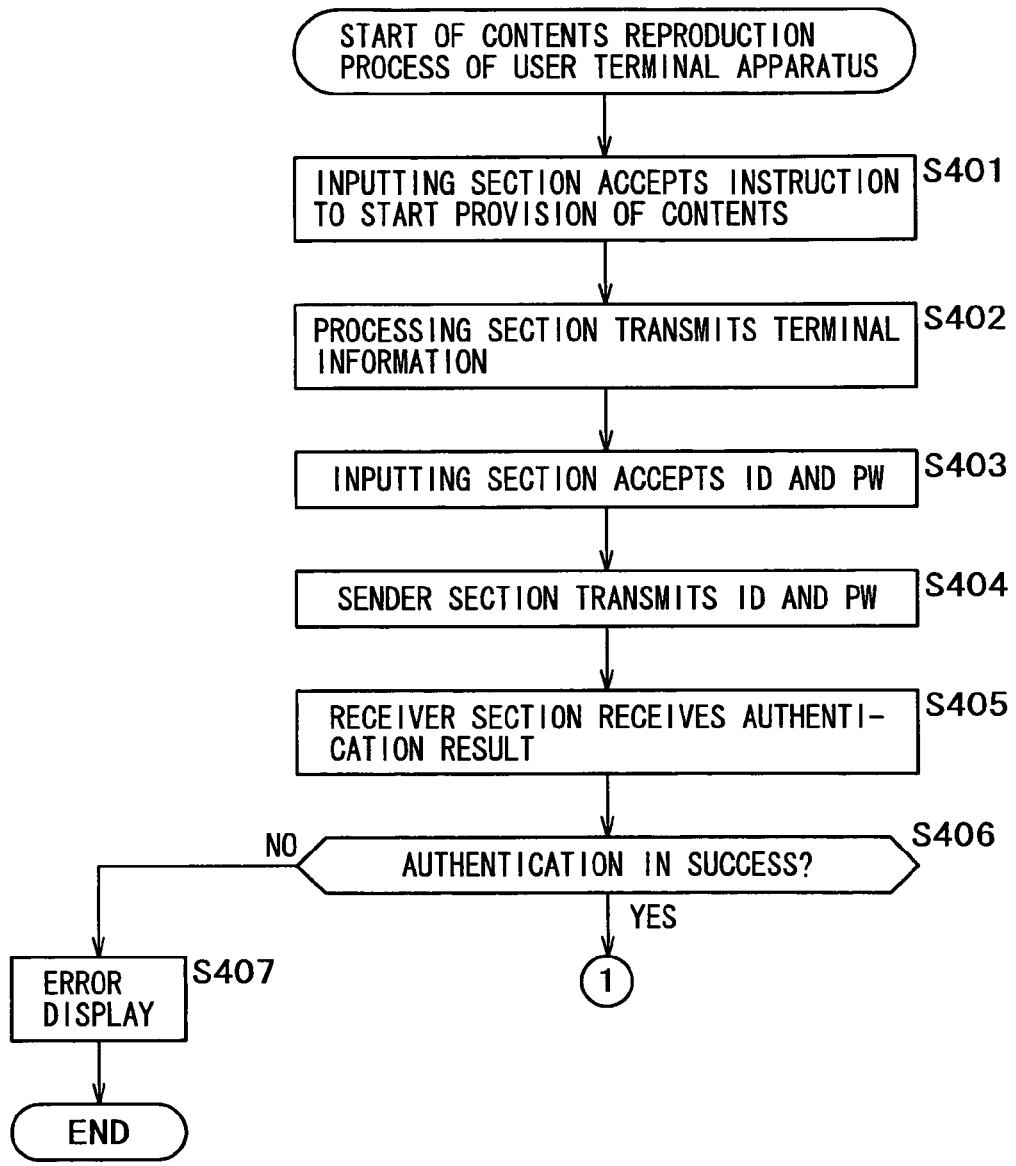

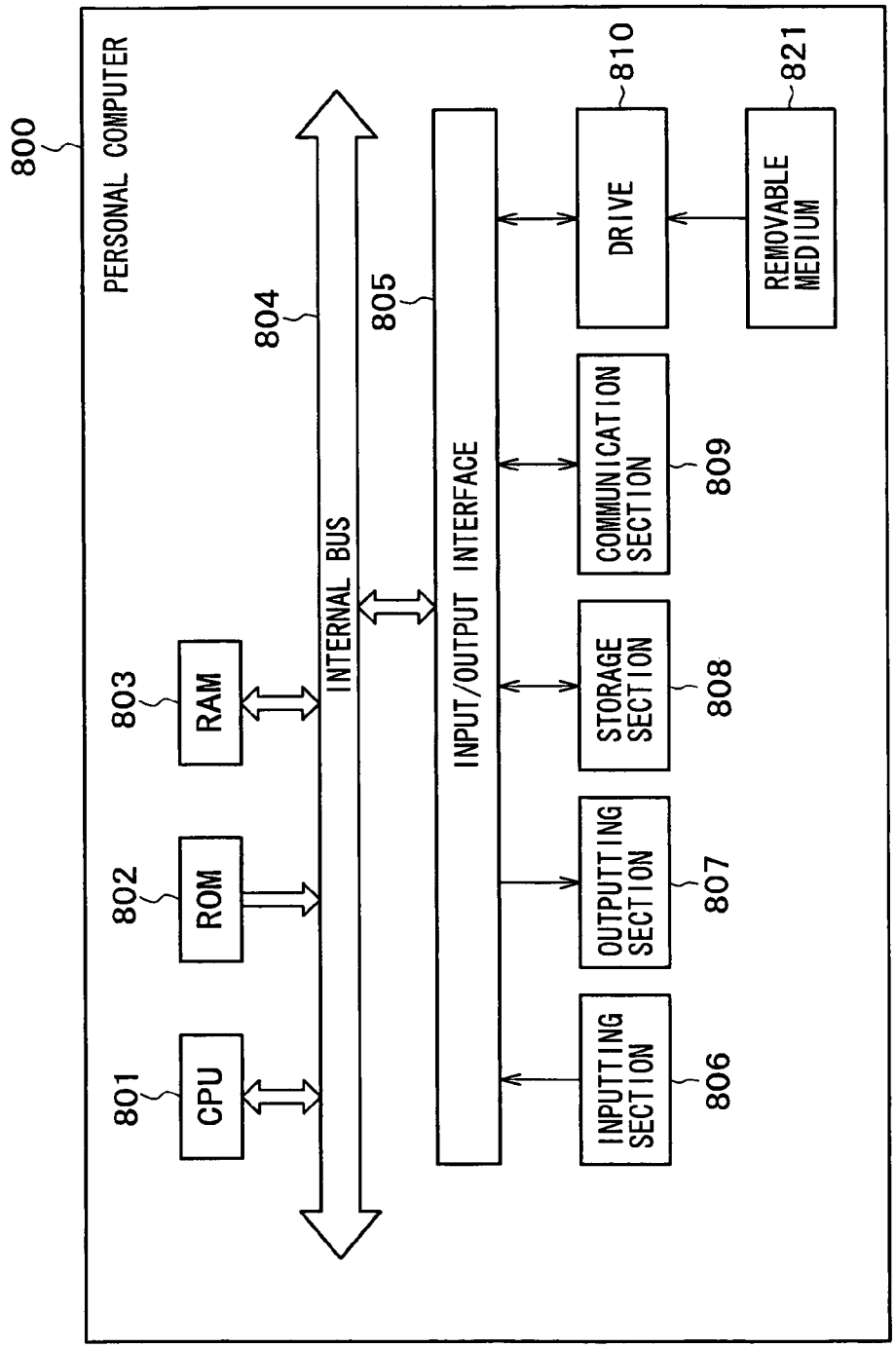

CONTENTS PROVIDING SYSTEM AND METHOD, PROVIDING APPARATUS AND METHOD, REPRODUCTION APPARATUS AND METHOD, AND PROGRAM

BACKGROUND OF THE INVENTION

This invention relates to a contents providing system and method, a providing apparatus and method, a reproduction apparatus and method, and a program. More particularly, the present invention relates to a contents providing system and method, a providing apparatus and method, a reproduction apparatus and method, and a program by which contents can be provided in accordance with the preference of a user.

Conventionally, when a server on a network tries to provide contents to a user terminal, it changes over the bit rate or the resolution of the contents in accordance with network environments of the user terminal so as to cope with the environments of the user terminal.

However, it is difficult for the server to selectively provide contents in accordance with the preference of the user.

A system wherein a broadcast program is selected based on an emotion representative of a degree of excitation or a degree of interest of a user is disclosed in Japanese Patent Laid-open No. 2001-100888 (hereinafter referred to as Patent Document 1). In the system of the Patent Document 1, the degree of excitation and the degree of interest of a user are detected based on an image of the face picked up using infrared rays. If it is determined that both of the degree of excitation and the degree of interest are low and the user is low-spirited, then a broadcast program is selected which provides a high degree of excitation and a high degree of interest reversely to those of the user to encourage the user.

However, when contents are provided from a server on a network to a user terminal, it is difficult for a server to change the quality, sound volume, or resolution of contents in accordance with the preference of the user registered in advance or select contents conforming to the preference of the user.

Further, when contents provided to the user do not conform to the preference of the user, the user itself is obliged to input an instruction to change the contents. Thus, there is a subject to be solved that the server side can found it only from the instruction of the user whether or not contents provided actually conform to the preference of the user.

Also it is a subject to be solved that it is difficult for the server side to select, adjust, and provide contents based on the preference of the user on the real time basis.

SUMMARY OF THE INVENTION

It is an object of the present invention to provide a contents providing system and method, a providing apparatus and method, a reproduction apparatus and method, and a program by which contents can be provided in accordance with the preference of a user.

In order to attain the object described above, according to an aspect of the present invention, there is provided a contents providing system for providing layered encoding contents, including storage means for storing first preference information representative of a preference of a user, selection means for selecting contents based on the first preference information stored in the storage means, reproduction means for reproducing the contents selected by the selection means, detection means for detecting second preference information representative of a preference of the user for the contents reproduced by the reproduction means, and adjustment means for adjusting the contents based on the second preference information detected by the detection means.

According to another aspect of the present invention, there is provided a contents providing method for a contents providing system for providing layered encoding contents, including a selection step of selecting contents based on first preference information stored in advance and representative of a preference of a user, a reproduction step of reproducing the contents selected by the process of the selection step, a detection step of detecting second preference information representative of a preference of the user for the contents reproduced by the process of the reproduction step, and an adjustment step of adjusting the contents based on the second preference information detected by the process of the detection step.

In the contents providing system and method, contents are selected based on first preference information stored in advance and representative of a preference of a user, and the selected contents are reproduced. Then, second preference information representative of a preference of the user for the reproduced contents is detected, and the contents are adjusted based on the second preference information.

Consequently, with contents providing system and method, contents conforming to the preference of the user can be provided. Particularly, contents can be selected and reproduced based on the first preference information stored in advance. Further, the contents can be adjusted based on the second preference information representative of a preference of the user for the reproduced contents.

According to a further aspect of the present invention, there is provided a providing apparatus for providing layered encoding contents, including first preference information acquisition means for acquiring first preference information stored in advance and representative of a preference of a user, selection means for selecting contents based on the first preference information acquired by the first preference information acquisition means, and adjustment means for adjusting the contents selected by the selection means based on the first preference information.

According to a still further aspect of the present invention, there is provided a providing method for a providing apparatus for providing layered encoding contents, including a preference information acquisition step of acquiring first preference information stored in advance and representative of a preference of a user, a selection step of selecting contents based on the first preference information acquired by the process of the preference information acquisition step, and an adjustment step of adjusting the contents selected by the process of the selection step based on the first preference information.

According to a yet further aspect of the present invention, there is provided a program for providing layered encoding contents, the program causing a computer to execute a process including a preference information acquisition step of acquiring first preference information stored in advance and representative of a preference of a user, a selection step of selecting contents based on the first preference information acquired by the process of the preference information acquisition step, and an adjustment step of adjusting the contents selected by the process of the selection step based on the first preference information.

In the providing apparatus, and method and the program, first preference information stored in advance and representative of a preference of a user is acquired, and contents are adjusted based on the first preference information. Then, the adjusted contents are reproduced.

With the providing apparatus and method and the program, contents conforming to the preference of the user can be provided. Further, contents can be selected based on the first preference information stored in advance. Furthermore, the contents can be adjusted based on the first preference information.

According to a yet further aspect of the present invention, there is provided a reproduction apparatus for reproducing layered encoding contents, including preference information acquisition means for acquiring first preference information stored in advance and representative of a preference of a user, contents acquisition means for acquiring contents to be reproduced, adjustment means for adjusting the contents acquired by the contents acquisition means based on the first preference information, and reproduction means for reproducing the contents adjusted by the adjustment means.

According to a yet further aspect of the present invention, there is provided a reproduction method for a reproduction apparatus for reproducing layered encoding contents, including a preference information acquisition step of acquiring first preference information stored in advance and representative of a preference of a user, a contents acquisition step of acquiring contents to be reproduced, an adjustment step of adjusting the contents acquired by the process of the contents acquisition step based on the first preference information, and a reproduction step of reproducing the contents adjusted by the process of the adjustment step.

According to a yet further aspect of the present invention, there is provided a program for reproducing layered encoding contents, the program causing a computer to execute a process including a preference information acquisition step of acquiring first preference information stored in advance and representative of a preference of a user, a contents acquisition step of acquiring contents to be reproduced, an adjustment step of adjusting the contents acquired by the process of the contents acquisition step based on the first preference information, and a reproduction step of reproducing the contents adjusted by the process of the adjustment step.

According to a yet further aspect of the present invention, there is provided a reproduction apparatus for reproducing layered encoding contents, including contents acquisition means for acquiring contents to be reproduced, reproduction means for reproducing the contents acquired by the contents acquisition means, detection means for detecting first preference information representative of a preference of the user for the contents reproduced by the reproduction means, and adjustment means for adjusting the contents based on the first preference information detected by the detection means.

According to a yet further aspect of the present invention, there is provided a reproduction method for a reproduction apparatus for reproducing layered encoding contents, including a contents acquisition step of acquiring contents to be reproduced, a reproduction step of reproducing the contents acquired by the process of the contents acquisition step, a detection step of detecting first preference information representative of a preference of the user for the contents reproduced by the process of the reproduction step, and an adjustment step of adjusting the contents based on the first preference information detected by the process of the detection step.

According to a yet further aspect of the present invention, there is provided a program for reproducing layered encoding contents, the program causing a computer to execute a process including a contents acquisition step of acquiring contents to be reproduced, a reproduction step of reproducing the contents acquired by the process of the contents acquisition step, a detection step of detecting first preference information representative of a preference of the user for the contents reproduced by the process of the reproduction step, and an adjustment step of adjusting the contents based on the first preference information detected by the process of the detection step.

In the reproduction apparatus, and methods and the programs, contents to be reproduced are acquired, and the acquired contents are reproduced. Further, first preference information representative of a preference of a user for the reproduced contents is detected, and the contents are adjusted based on the detected first preference information.

With the reproduction apparatus, and methods and the programs, contents conforming to the preference of the user can be provided. Further, contents can be selected based on the first preference information stored in advance. Furthermore, the contents can be adjusted based on the first preference information and reproduced.

BRIEF DESCRIPTION OF THE DRAWINGS

These and other objects of the invention will be seen by reference to the description, taken in connection with the accompanying drawing, in which:

FIG. 1 is a block diagram showing an example of a configuration of an entire providing system to which the present invention is applied;

FIG. 8 is a view illustrating an example of preference information stored in a preference information storage section shown in FIG. 3;

FIGS. 19, 20, and 21 are flow charts illustrating a contents reproduction process of the user terminal apparatus of FIG. 17;

FIG. 22 is a block diagram showing an example of a configuration of a personal computer to which the present invention is applied.

DETAILED DESCRIPTION OF THE PREFERRED EMBODIMENTS

Before preferred embodiments of the present invention are described in detail, a corresponding relationship between several features set forth in the accompanying claims and particular elements of the preferred embodiments described below is described. The description, however, is merely for the confirmation that the particular elements which support the invention as set forth in the claims are disclosed in the description of the embodiment of the present invention. Accordingly, even if some particular element which is set forth in description of the embodiments is not set forth as one of the features in the following description, this does not signify that the particular element does not correspond to the feature. On the contrary, even if some particular element is set forth as an element corresponding to one of the features, this does not signify that the element does not correspond to any other feature than the element.

Further, the following description does not signify that the prevent invention corresponding to particular elements described in the embodiments of the present invention is all described in the claims. In other words, the following description does not deny the presence of an invention which corresponds to a particular element described in the description of the embodiments of the present invention but is not set forth in the claims, that is, the description does not deny the presence of an invention which may be filed for patent in a divisional patent application or may be additionally included into the present patent application as a result of later amendment to the claims.

Figure 2:
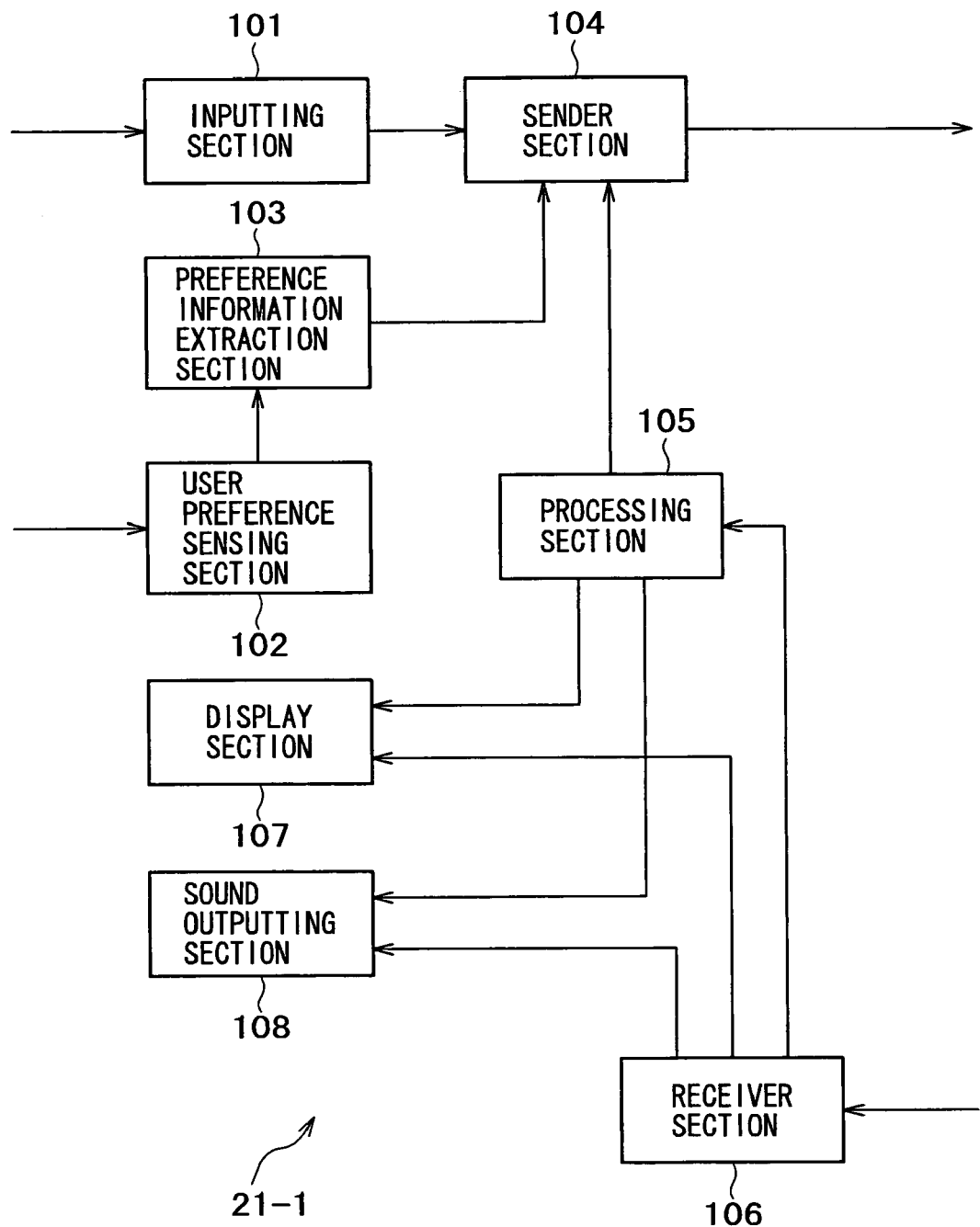
FIG. 2 is a block diagram showing an example of a functional configuration of a user terminal apparatus shown in FIG. 1.
Figure 3:
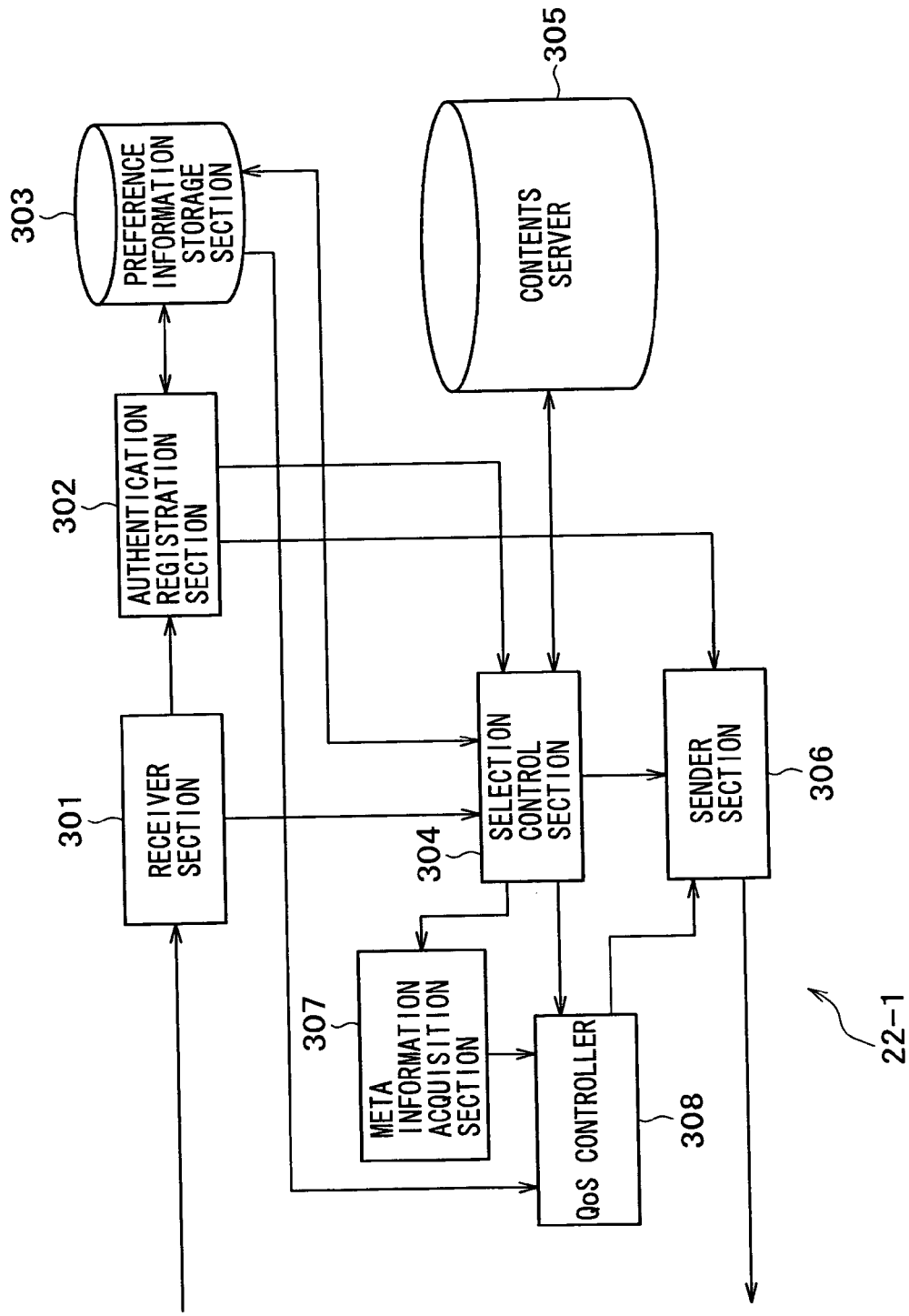
FIG. 3 is a block diagram showing an example of a functional configuration of a contents providing apparatus shown in FIG. 1.

A contents providing system may include storage means (for example, a preference information storage section 303 of FIG. 3) for storing first preference information (for example, static preference information 400 of FIG. 8) representative of a preference of a user, selection means (for example, a selection control section 304 of FIG. 3) for selecting contents based on the first preference information stored in the storage means, reproduction means (for example, a display section 107 and a sound outputting section 108 of FIG. 2) for reproducing the contents selected by the selection means, detection means (for example, a preference information extraction section 103 of FIG. 2) for detecting second preference information representative of a preference of the user for the contents reproduced by the reproduction means, and adjustment means (for example, a QoS controller 308 of FIG. 3) for adjusting the contents based on the second preference information detected by the detection means.

A contents providing method may include a selection step (for example, a step S112 of FIG. 7) of selecting contents based on first preference information stored in advance and representative of a preference of a user, a reproduction step (for example, steps S11 and S12 of FIG. 5) of reproducing the contents selected by the process of the selection step, a detection step (for example, a step S14 of FIG. 5) of detecting second preference information representative of a preference of the user for the contents reproduced by the process of the reproduction step, and an adjustment step (for example, a step S115 of FIG. 7) of adjusting the contents based on the second preference information detected by the process of the detection step.

A providing apparatus (for example, a contents providing apparatus 22-1 of FIG. 3) may include first preference information acquisition means (for example, a selection control section 304 of FIG. 3 which executes a process at step S110 of FIG. 6) for acquiring first preference information (for example, static preference information 400 of FIG. 8) stored in advance and representative of a preference of a user, selection means (for example, a selection control section 304 of FIG. 3 which executes a process at step S112 of FIG. 7) for selecting contents based on the first preference information acquired by the first preference information acquisition means, and adjustment means (for example, a QoS controller 308 of FIG. 3 which executes a process at step S115 of FIG. 7) for adjusting the contents selected by the selection means based on the first preference information.

The providing apparatus may further include second preference information acquisition means (for example, a receiver section 301 of FIG. 3 which executes a process at step S117 of FIG. 7) for acquiring second preference information (for example, dynamic preference information) representative of a preference of the user for the reproduced contents adjusted by the adjustment means, the adjustment means further adjusting contents to be reproduced next based on the second preference information acquired by the second preference information acquisition means.

The providing apparatus may further include meta information acquisition means (for example, a metal information acquisition section 307 of FIG. 3) for acquiring meta information from within the contents selected by the selection means, the adjustment means adjusting the contents based on the first preference information and the meta information.

A providing method may include a preference information acquisition step (for example, a step S110 of FIG. 6) of acquiring first preference information stored in advance and representative of a preference of a user, a selection step (for example, a step S112 of FIG. 7) of selecting contents based on the first preference information acquired by the process of the preference information acquisition step, and an adjustment step (for example, a step S115 of FIG. 7) of adjusting the contents selected by the process of the selection step based on the first preference information.

Figure 10:
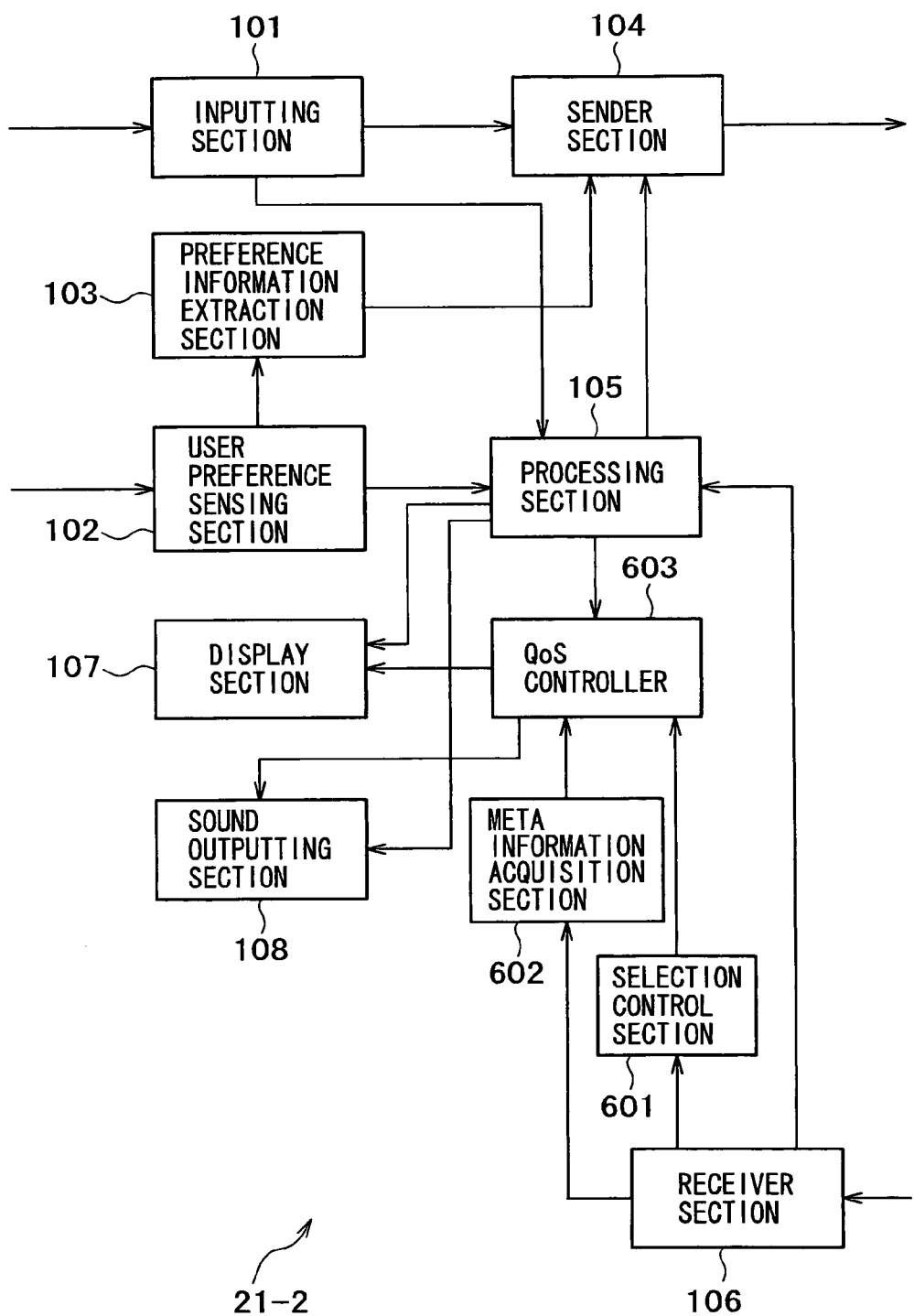
FIG. 10 is a block diagram showing another example of a functional configuration of the user terminal apparatus shown in FIG. 1.

A reproduction apparatus (for example, a user terminal apparatus 21-2 of FIG. 10) may include preference information acquisition means (for example, a receiver section 106 of FIG. 10 which executes a process at step S209 of FIG. 12) for acquiring first preference information stored in advance and representative of a preference of a user, contents acquisition means (for example, a receiver section 106 of FIG. 17 which executes a process at step S214 of FIG. 13) for acquiring contents to be reproduced, adjustment means (for example, a QoS controller 603 of FIG. 10 which executes a process at step S218 of FIG. 13) for adjusting the contents acquired by the contents acquisition means based on the first preference information, and reproduction means (for example, a display section 107 and a sound outputting section 108 of FIG. 10) for reproducing the contents adjusted by the adjustment means.

The reproduction apparatus may be configured such that the contents acquisition means includes contents selection means (for example, a selection control section 601 of FIG. 10 which executes a process at step S215 of FIG. 13) for selecting contents based on the first preference information.

The reproduction apparatus may further include detection means (for example, a preference information extraction section 103 of FIG. 10) for detecting second preference information (for example, dynamic preference information) representative of a preference of the user for the contents reproduced by the reproduction means, the adjustment means further adjusting the contents based on the second preference information detected by the detection means.

The reproduction apparatus may further include meta information acquisition means (for example, a meta information acquisition means 602 of FIG. 10) for acquiring meta information from within the contents acquired by the contents acquisition means, the adjustment means adjusting the contents based on the first preference information and the meta information.

A reproduction method may include a preference information acquisition step (for example, a step S209 of FIG. 12) of acquiring first preference information stored in advance and representative of a preference of a user, a contents acquisition step (for example, a step S214 of FIG. 13) of acquiring contents to be reproduced, an adjustment step (for example, a step S218 of FIG. 13) of adjusting the contents acquired by the process of the contents acquisition step based on the first preference information, and a reproduction step (for example, steps S219 and S220 of FIG. 14) of reproducing the contents adjusted by the process of the adjustment step.

Figure 17:
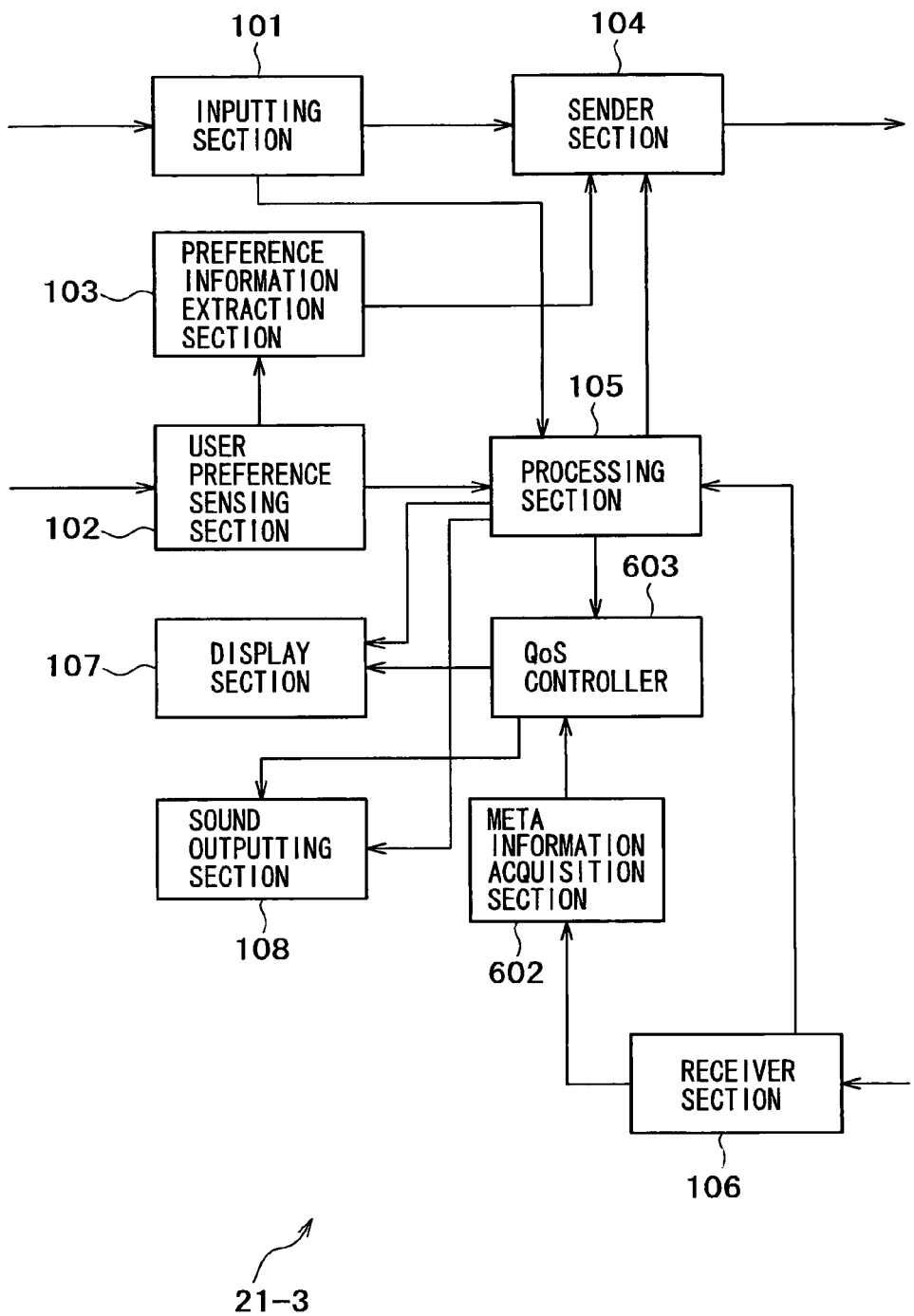
FIG. 17 is a block diagram showing a further example of a functional configuration of the user terminal apparatus shown in FIG. 1.

A reproduction apparatus may include contents acquisition means (for example, a receiver section 106 of FIG. 17 which executes a process at step S410 of FIG. 20) for acquiring contents to be reproduced, reproduction means (for example, a display section 107 and a sound outputting section 108 of FIG. 17) for reproducing the contents acquired by the contents acquisition means, detection means (for example, a preference information extraction section 103 of FIG. 17) for detecting first preference information representative of a preference of the user for the contents reproduced by the reproduction means, and adjustment means (for example, a QoS controller 603 of FIG. 17) for adjusting the contents based on the first preference information detected by the detection means.

The reproduction apparatus may further include meta information acquisition means (for example, a meta information acquisition section 602 of FIG. 17) for acquiring meta information from within the contents acquired by the contents acquisition means, the adjustment means adjusting the contents based on the first preference information and the meta information.

A reproduction method may include a contents acquisition step (for example, a step S410 of FIG. 20) of acquiring contents to be reproduced, a reproduction step (for example, steps S413 and S414 of FIG. 20) of reproducing the contents acquired by the process of the contents acquisition step, a detection step (for example, a step S416 of FIG. 21) of detecting first preference information representative of a preference of the user for the contents reproduced by the process of the reproduction step, and an adjustment step (for example, a step S412 for the second time of FIG. 20) for adjusting the contents based on the first preference information detected by the detection step.

It is to be noted that the corresponding relationship between features of a program and particular elements in the embodiments of the present invention is similar to that of the information processing method described hereinabove. Therefore, overlapping description of the corresponding relationship is omitted herein to avoid redundancy. Further, the corresponding relationship between features of a program and particular elements in the embodiments of the present invention is similar to that of the reproduction method described hereinabove. Therefore, overlapping description of the corresponding relationship is omitted herein to avoid redundancy.

In the following, preferred embodiments of the present invention are described with reference to the drawings.

FIG. 1 shows an example of a configuration of an entire providing system 1 to which the present invention is applied.

Referring to FIG. 1, in the providing system 1 shown, a user terminal apparatus 21 and a contents providing apparatus 22 are connected to each other by a network 11. The contents providing apparatus 22 provides contents to the user terminal apparatus 21 through the network 11. The contents provided are layered encoding contents. Three embodiment wherein the contents providing apparatus 22 provides contents to the user terminal apparatus 21 are described below. First, the first embodiment of the present invention is described with reference to FIGS. 2 to 9.

FIG. 2 shows an example of a functional configuration of a user terminal apparatus 21-1 (of the first embodiment) which is an example of the user terminal apparatus 21 of FIG. 1. In the following description, the user terminal apparatus 21 of the first embodiment of the present invention is referred to as user terminal apparatus 21-1.

The user terminal apparatus 21-1 includes an inputting section 101, a user preference sensing section 102, a preference information extraction section 103, a sender section 104, a processing section 105, a receiver section 106, a display section 107, and a sound outputting section 108.

The inputting section 101 is formed, for example, from a keyboard, a mouse, and so forth and accepts an instruction from a user. The user preference sensing section 102 senses the state of the user such as the pulse rate, respiration frequency, respiration period, tonus of the muscles of the limbs, brain bloodstream, brain wave, perspiration amount, skin temperature, pupil diameter, eye opening, winking, expression, bloodstream of the limbs, bloodstream of the ear lobes, or temperature of the limbs, and outputs a result of the sensing to the preference information extraction section 103. The preference information extraction section 103 extracts preference information representative of the preference of the user from the sensing result of the user preference sensing section 102 (such as the pulse rate, respiration frequency, respiration period, tonus of the muscles of the limbs, brain bloodstream, brain wave, perspiration amount, skin temperature, pupil diameter, eye opening, winking, expression, bloodstream of the limbs, bloodstream of the ear lobes, or temperature of the limbs).

The sender section 104 transmits various kinds of information supplied thereto from the inputting section 101, preference information extraction section 103, and processing section 105 through the network 11. The processing section 105 executes various processes based on information supplied thereto from the inputting section 101 or the receiver section 106 and controls the sender section 104, display section 107, and sound outputting section 108 to execute various processes. The receiver section 106 receives various kinds of information through the network 11.

The display section 107 displays based on information supplied thereto from the processing section 105 or receiver section 106. The sound outputting section 108 outputs sound based on information supplied thereto from the processing section 105 or receiver section 106.

FIG. 3 shows an example of a functional configuration of a contents providing apparatus 22-1 (of the first embodiment) which is an example of the contents providing apparatus 22 of FIG. 1.

The contents providing apparatus 22-1 includes a receiver section 301, an authentication registration section 302, a preference information storage section 303, a selection control section 304, a contents server 305, a sender section 306, a meta information acquisition section 307, and a QoS controller 308.

The receiver section 301 receives various kinds of information through the network 11. The authentication registration section 302 authenticates whether or not an ID and a PW (password) for identifying a user are correct and executes a process of registering preference information. The preference information storage section 303 stores IDs and PWs as well as preference information and so forth corresponding to the IDs.

The selection control section 304 selects, based on preference information acquired from the receiver section 301, authentication registration section 302, or preference information storage section 303, contents conforming to the preference information from the contents server 305. The selected contents are supplied to the sender section 306 or the meta information acquisition section 307.

The contents server 305 has a plurality of pieces of contents (for example, contents A1, A2, A3, ..., An [n is a natural number equal to or greater than 1]) recorded therein. In particular, a plurality of pieces of contents (contents A1-1 to A1-k [k is a natural number equal to or greater than 1]) such as, for example, contents of movies which have the same title (contents A1) but have different recording rates or are modified at some part such as frightening scenes (to different stories) are recorded in the contents server 305. Also contents of different genres (news, sports, horrors, and so forth) are recorded. The sender section 306 transmits information supplied thereto from the authentication registration section 302, selection control section 304, or QoS controller 308 through the network 11.

The meta information acquisition section 307 acquires meta information from within contents supplied thereto from the selection control section 304. The meta information acquisition section 307 outputs the meta information to the QoS controller 308. The meta information is included in contents as hereinafter described with reference to FIG. 8. The QoS controller 308 adjusts contents based on meta information and preference information supplied thereto from the preference information storage section 303 and outputs the adjusted contents to the sender section 306.

Now, processes of the contents providing apparatus 22-1 of FIG. 3 when it provides contents to the user terminal apparatus 21-1 of FIG. 2 are described with reference to FIGS. 4 to 7. First, a contents reproduction process of the user terminal apparatus 21-1 of FIG. 2 is described with reference to FIGS. 4 and 5. It is to be noted that this process is started when an instruction to start provision of contents is inputted to the inputting section 101 by the user.

At step S1, the inputting section 101 accepts an instruction to start provision of contents from the user.

At step S2, the processing section 105 supplies terminal information of the user terminal apparatus 21-1 to the sender section 104. The sender section 104 transmits the terminal information to the contents providing apparatus 22-1 through the network 11. More particularly, such terminal information as network environments of the user terminal apparatus 21-1, the resolution of the display section 107, the capacity of the processing section 105, and so forth is transmitted.

At step S3, the inputting section 101 accepts an input of an IP and a PW from the user. At this time, an input screen for an ID and a PW may be displayed on the display section 107 to urge the user to input an ID and a PW to the inputting section 101.

At step S4, the sender section 104 transmits the ID and the PW acquired by the inputting section 101 by the process at step S3 to the contents providing apparatus 22-1 through the network 11. In the case of the present example, IDs and PWs of all (plural) users are stored in the preference information storage section 303 of the contents providing apparatus 22-1, and authentication of the ID and the PW is performed by the contents providing apparatus 22-1. In particular, the contents providing apparatus 22-1 receives the ID and the PW transmitted from the sender section 104 at step S4 and determines whether or not the IP and the PW coincide with some of the IDs and the PWs stored in the preference information storage section 303 to perform authentication of the IP and the PW. Then, the contents providing apparatus 22-1 transmits a result of the authentication to the user terminal apparatus 21-1 (processes at steps S104, S107, and S108 of FIG. 6 hereinafter described).

Thus, at step S5, the receiver section 106 receives the result of authentication transmitted from the contents providing apparatus 22-1 through the network 11. The receiver section 106 supplies the received authentication result to the processing section 105.

At step S6, the processing section 105 determines whether or not the authentication results in success (whether or not the authentication result is OK). If it is determined that the authentication does not result in success (the authentication result is NG), then the display section 107 performs an error display at step S7, and the processing is ended.

On the other hand, if it is determined at step S6 that the authentication results in success (the authentication result is OK), then the inputting section 101 accepts selection of contents by the user at step S8. In this instance, for example, the processing section 105 may display a selection screen for contents (or a genre) on the display section 107 or output sound urging the user for selection from the sound outputting section 108 to urge the user to perform an inputting operation. It is assumed here that, for example, the contents A1 are selected from among the contents A1, A2, ..., An (n is an integer equal to or greater than 1) by the user.

At step S9, the sender section 104 transmits a signal for requesting the selected contents A1 to the contents providing apparatus 22-1 through the network 11. When the contents providing apparatus 22-1 receives the signal, it transmits sub contents (for example, sub contents A1-1-1) which form the requested contents (step S116 of FIG. 7 hereinafter described). The contents are formed from a plurality of pieces of divisional sub contents. For example, one piece of sub contents is formed from a plurality of frames indicating a single scene. It is to be noted that one piece of sub contents need not be formed from a plurality of frames, but may otherwise be formed from a single frame such that one scene is formed from a plurality of pieces of sub contents.

When the sub contents are transmitted from the contents providing apparatus 22-1, the receiver section 106 receives the sub contents at step S10. In the case of the present example, the sub contents A1-1-1 are received.

At step S11, the display section 107 displays an image based on the sub contents A1-1-1. At step S12, the sound outputting section 108 outputs sound based on the sub contents A1-1-1.

At step S13, the user preference sensing section 102 senses the preference of the user. More particularly, the user preference sensing section 102 senses the pulse rate, respiration frequency, respiration period, tonus of the muscles of the limbs, brain bloodstream, brain wave, perspiration amount, skin temperature, pupil diameter, eye opening, winking, expression, bloodstream of the limbs, bloodstream of the ear lobes, or temperature of the limbs of the user.

At step S14, the preference information extraction section 103 acquires a result of the sensing by the process at step S13 and extracts dynamic preference information of the user based on the result. Since the user has some feeling when it views the sub contents A1-1-1 reproduced at steps S11 and S12, the preference information extraction section 103 extracts preference information representative of what feeling the user has for the contents (sub contents A1-1-1).

For example, the preference information extraction section 103 extracts, based on data representative of the time of winking, data representative of a change of the pupil diameter, and data representative of a movement of the mouth (data sensed by the user preference sensing section 102), a period of time within which winking occurs less frequently corresponding to a period of time within which the pupil diameter (eye opening) is large. Further, the preference information extraction section 103 extracts, based on the movement of the mouth and so forth, information whether or not the user is laughing or smiling.

Further, the preference information extraction section 103 extracts information representative of surprise based on data representative of the change of the eye opening and data representative of the tonus of the muscles of the limbs (data sensed by the user preference sensing section 102). Further, the preference information extraction section 103 extracts information representative of the tonus based on data representative of the perspiration amount, data representative of the heart rate and a rising degree of the heart rate, data representative of a variation of the pupil diameter, data representative of a variation of the bloodstream of the limbs, and data representative of the temperature of the limbs.

Further, the recognition evaluation value representative of the degree of the interest or concern is calculated based on data representative of the eye opening, the winking, the heart rate, and so forth. The recognition evaluation value representative of the strength of impression is calculated based on data representative of a variation of the eye opening, a variation of the heart rate, the perspiration amount, and so forth. The recognition evaluation value representative of the degree of the desirableness is calculated based on the stability of the heart rate, the stability of the perspiration amount, the temperature of the limbs, the bloodstream of the limbs, and so forth. The recognition evaluation value representative of the degree of the fear is calculated based on information representative of the surprise and information representative of the tonus extracted once by the preference information extraction section 103.

Based on the various kinds of organism information mentioned above, for example, with regard to the "desirability", "fear", and "anger", the temperature of the limbs is determined with reference to two threshold values P1 and P2. For example, if the temperature of the limbs is higher than the threshold value P1 and higher than the threshold value P2, then it is determined that the feeling of the user is the "anger"; if the temperature of the limbs is lower than the threshold value P1 but higher than the threshold value P2, then it is determined that the feeling of the user is the "desirableness"; and if the temperature of the limbs is lower than the threshold value P1 and lower than the threshold value P2, then it is determined that the feeling of the user is the "fear". At this time, even if it is difficult for the preference information extraction section 103 to distinguish the feeling of the user between the "anger" and the "desirableness" based on the temperature, the distinction can be determined depending upon the heart rate or the degree of the tonus.

Further, with regard to the "fear" and the "anger" which commonly involve the tonus, since the "fear" frequently accompanies perspiration, the preference information extraction section 103 can distinguish the "fear" and the "anger" from each other in this regard. In this manner, the preference information extraction section 103 can extract information for determination of the preference of the user based on the various kinds of organism information.

Consequently, the preference information representative of in what state the user who is viewing the sub contents A1-1-1 (image and sound) reproduced by the processes at steps S11 and S12 is can be extracted. In this manner, the preference information of the user for the contents being reproduced actually is hereinafter referred to as dynamic preference information.

Referring back to FIG. 5, at step S15, the sender section 104 transmits the dynamic preference information (preference information extracted at step S14) to the contents providing apparatus 22-1 through the network 11.

At step S16, the processing section 105 discriminates whether or not all of the contents selected at step S8 are completed (all of the sub contents A1-1-1 to A1-1-m [m is an arbitrary natural number equal to or greater than 1] included in the contents A1 are reproduced). If it is determined that the contents are not completed, then the processing returns to step S10 so that the processes at the steps beginning with step S10 are repeated. In other words, the next sub contents (sub contents A1-1-2) are received and reproduced, and dynamic preference information of the user for the sub contents is extracted and transmitted to the contents providing apparatus 22-1.

The dynamic preference information transmitted (at step S15) from (the sender section 104 of) the user terminal apparatus 21-1 is received by the contents providing apparatus 22-1. When the next sub contents are present (that is, when the determination at step S6 is YES), the contents providing apparatus 22-1 adjusts (controls) the sub contents to be provided next (for example, the sub contents A1-1-2) based on the received dynamic preference information. Then, the contents providing apparatus 22-1 transmits the adjusted (controlled) sub contents to the user terminal apparatus 21-1.

In particular, the sub contents (sub contents A1-1-2) to be provided next are adjusted (controlled) and provided based on the dynamic preference information of the user for the sub contents (for example, the sub contents A1-1-1) received at step S10 and reproduced. Consequently, the sub contents are received again by the process at step S10 (next process when the determination at step S16 is NO).

If it is determined at step S16 that the contents are completed, then the processing section 105 discriminates at step S17 whether or not next contents should be viewed. The processing section 105 determines this depending upon whether or not an instruction to reproduce next contents is inputted to the inputting section 101. If it is determined that next contents are to be reproduced (that an instruction to reproduce next contents is inputted to the inputting section 101), then the processing returns to step S8 so that the processes at the steps beginning with step S8 are repeated. In particular, selection of next contents is accepted and the next contents are reproduced.

If it is discriminated at step S17 that next contents are not to be reproduced, then the processing is ended.

Figure 4:
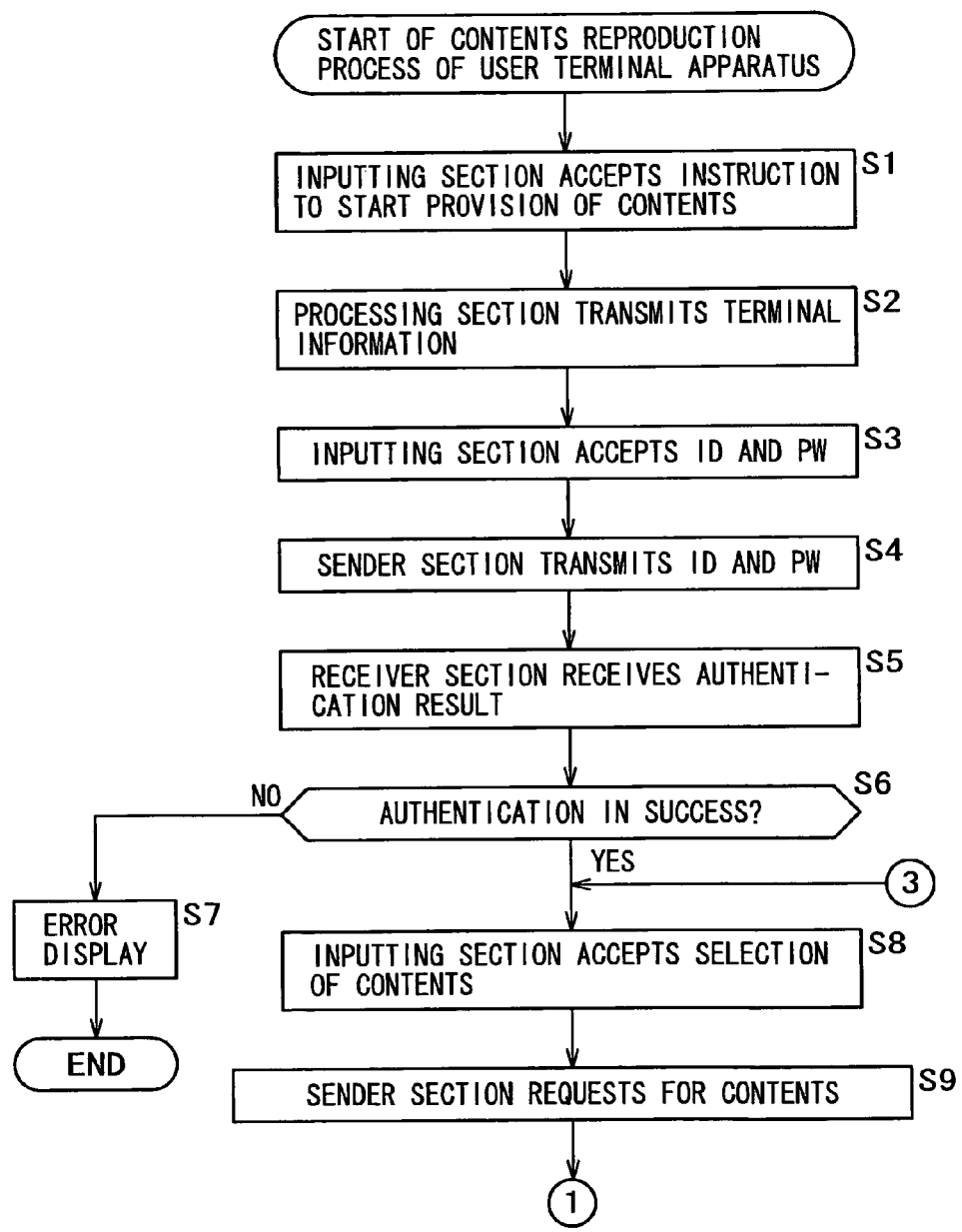
FIGS. 4 and 5 are flow charts illustrating a contents reproduction process of the user terminal apparatus of FIG. 2.
Figure 5:
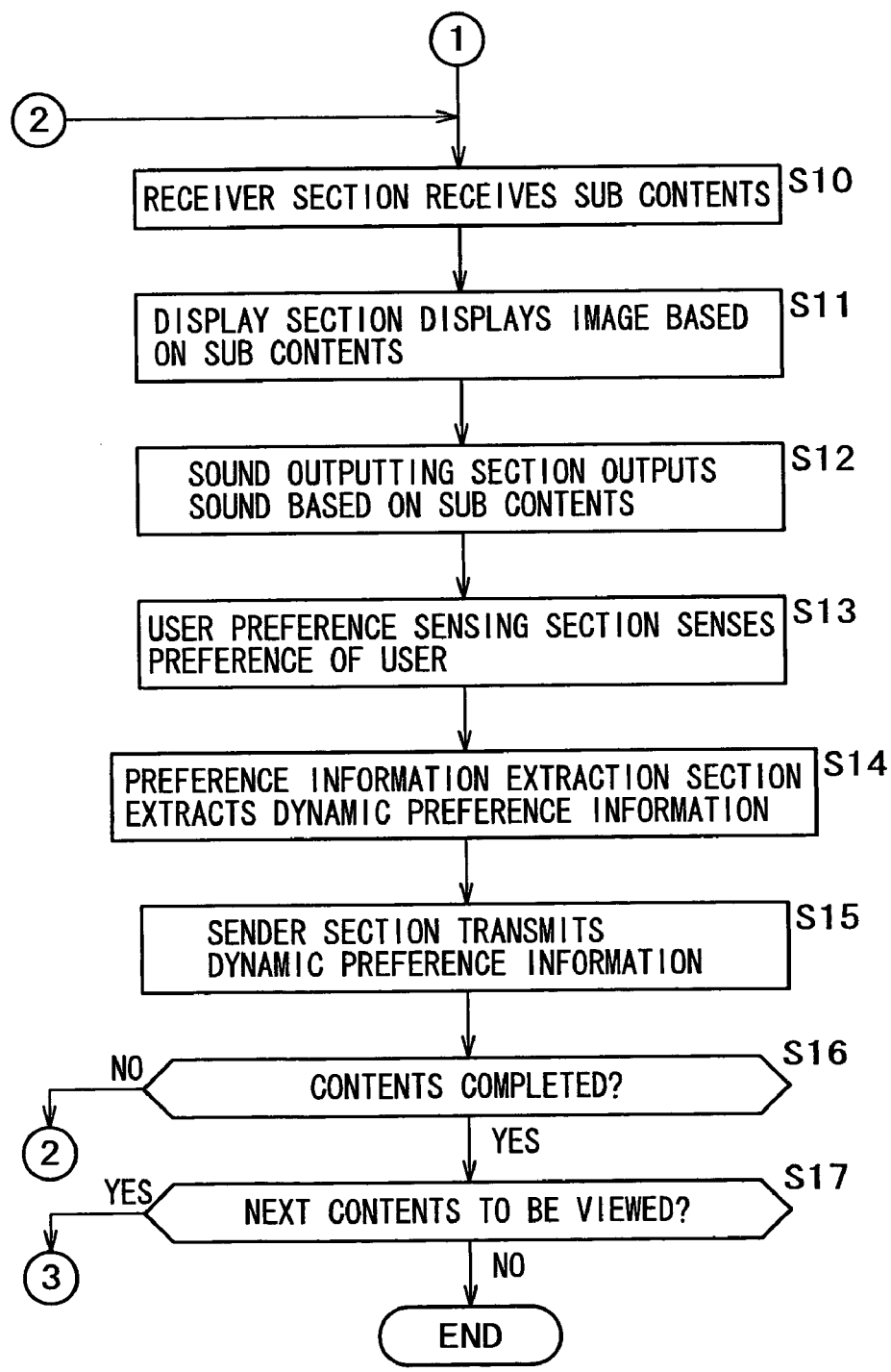

Through the process of FIGS. 4 and 5, the dynamic preference information for the contents being actually viewed by the user are extracted and transmitted to the contents providing apparatus 22-1.

Now, a contents providing process, which corresponds to the process of the user terminal apparatus 21-1 of FIGS. 4 and 5, of the contents providing apparatus 22-1 of FIG. 3 is described with reference to FIGS. 6 and 7.

At step S101, the receiver section 301 receives terminal information transmitted thereto from the user terminal apparatus 21-1. The terminal information is transmitted from the sender section 104 of the user terminal apparatus 21-1 by the process at step S2 of FIG. 4 described hereinabove. The terminal information includes network environments of the user terminal apparatus 21-1, the resolution of the display section 107, the capacity of the processing section 105, and so forth. The receiver section 301 transmits the received terminal information to the selection control section 304. The contents providing apparatus 22-1 can transmit information suitable for the user terminal apparatus 21-1 to the user terminal apparatus 21-1 with reference to the terminal information.

At step S102, the receiver section 301 receives an ID and a PW transmitted thereto from the user terminal apparatus 21-1. The ID and the PW are inputted by the user by the process at step S3 of FIG. 4 described hereinabove and transmitted by the sender section 104 by the process at step S4.

At step S103, the authentication registration section 302 acquires an ID and a PW corresponding to the ID received by the process at step S102 from the preference information storage section 303. The ID and the PW are registered in advance by the user.

At step S104, the authentication registration section 302 determines whether or not the ID and the PW received by the process at step S102 (the ID and the PW inputted by the user at step S3 of FIG. 4) and the ID and the PW acquired by the process at step S103 (the ID and the PW stored in advance in the preference information storage section 303) coincide with each other, respectively. If it is determined that they do not coincide with each other (that is, the ID and the PW inputted at step S3 of FIG. 4 are wrong), then the authentication registration section 302 outputs an authentication result indicative of failure in authentication at step S105. The sender section 306 transmits the authentication result to the user terminal apparatus 21-1 through the network 11, and then, the processing is ended. The user terminal apparatus 21-1 receives the authentication result (at step S5 of FIG. 4) and determines based on the received authentication result whether or not the authentication results in success (step S6 of FIG. 4).

If it is determined at step S104 that the IDs and the PWs coincide with each other, then the authentication registration section 302 outputs an authentication result indicative of success of authentication to the sender section 306 at step S107. The sender section 306 transmits the authentication result to the user terminal apparatus 21-1 through the network 11 at step S108. The user terminal apparatus 21-1 receives the authentication result (at step S5 of FIG. 4) and determines based on the received authentication result whether or not the authentication results in success (step S6 of FIG. 4).

If the user terminal apparatus 21-1 determines at step S6 that the authentication results in success, then it accepts selection of contents at step S7 and transmits a request for the contents at step S8.

Thus, the receiver section 301 of the contents providing apparatus 22-1 receives the request for the contents and transmits the request to the selection control section 304 at step S109.

At step S110, the selection control section 304 acquires static preference information of the user corresponding to the IP and the PW acquired by the process at step S103 (the ID and the PW when the authentication results in success) from the preference information storage section 303. The user registers own preference information in the preference information storage section 303 together with the ID and the PW of the user itself in advance. The preference information registered in advance in this manner is hereinafter referred to as static preference information. An example of the static preference information stored in the preference information storage section 303 is illustrated in FIG. 8.

FIG. 8 illustrates static preference in formation 400 of one user. The static preference information 400 includes the ID and the PW of the user as well as genre information 411 and apparatus information 412.

The example of FIG. 8 includes, as the genre of contents of the genre information 411, "Sports", "Horror", and "News". The picture quality, image process, sound quality, CPU (Central Processing Unit) processing capacity, and cost for each of the genres are registered. It is to be noted that, in the picture quality, "A" indicates the highest picture quality while "C" indicates the lowest picture quality (the degrees of the picture quality have a relationship of A>B>C). Meanwhile, the processing capacity of the CPU is not set by the user but by the contents providing apparatus 22-1 side based on such information as the picture quality, image process, sound quality, and cost. The processing capacity of the CPU is a parameter representative of what degree of capacity is required for the CPU.

Where the genre is "sports", the picture quality is set to "A"; the image process to "motion preferential"; the sound quality to "normal"; the CPU processing capacity to "high"; and the cost to "normal". Meanwhile, where the genre is "horror", the picture quality is set to "A"; the image process to "shaded"; the sound quality to "low"; the CPU processing capacity to "high"; and the cost to "normal". Further, where the genre is "news", the picture quality is set to "C"; the image process to "no"; the sound quality to "high"; the CPU processing capacity to "low"; and the cost to "low".

The apparatus information 412 includes types of "PDA (Personal Digital Assistant)", "TV (Television)", and "PC (Personal Computer)". The picture quality, image process, sound quality, CPU processing capacity, and cost are registered for each of the apparatus.

Where the apparatus is "PDA", the picture quality is set to "C"; the image process to "low"; the sound quality to "low"; the CPU processing capacity to "low"; and the cost to "low". Meanwhile, where the apparatus is "TV", the picture quality is set to "B"; the image process to "medium"; the sound quality to "high"; the CPU processing capacity to "medium"; and the cost to "medium". Further, where the apparatus is "PC", the picture quality is set to "A"; the image process to "high"; the sound quality to "medium"; the CPU processing capacity to "high"; and the cost to "high".

Where the static preference information of a user includes preferences of the picture quality and the cost in this manner, it is possible to link the picture quality to the cost to control (adjust) the network band so that an excessively great band may not be used. Consequently, since the user can acquire contents within a range of the cost desired by the user itself, a high degree of satisfaction of the user can be anticipated.

At step S110, the selection control section 304 acquires information of an apparatus corresponding to the terminal information acquired by the process at step S101 from within such static preference information 400 as illustrated in FIG. 8 from the apparatus information 412 and further acquires information of the genre corresponding to the request for contents received by the process at step S109. Then, the selection control section 304 supplies the acquired information and the terminal information (terminal information received by the receiver section 301 by the process at step S101) to the QoS controller 308. The selection control section 304 acquires, for example, information wherein the apparatus is the TV and the genre is the horror.

Then at step S111, the QoS controller 308 determines a processing method for the contents. More particularly, the QoS controller 308 determines a contents processing method based on the terminal information and the static preference information. The terminal information is received by the process at step S101 (information of the network environments of the user terminal apparatus 21-1, the resolution of the display section 107, the capacity of the processing section 105 and so forth). The static preference information is acquired by the selection control section 304 by the process at step S110 (for example, in the static preference information 400 of FIG. 8, information that the apparatus is the TV and the genre is the horror). For example, the static preference information whose genre is the horror includes the information that the image process is "shaded" and the picture quality is A (high picture quality). Meanwhile, the static preference information whose apparatus is the TV includes the information that the image process is "medium" and the picture quality is "B". Therefore, the QoS controller 308 determines a processing method such that an average picture quality and an average image process may be performed. Further, for example, where the terminal information includes such information that the available band is small in transmission through the network, the QoS controller 308 determines a processing method for the contents such that the picture quality is further lowered.

At step S211, the selection control section 304 acquires sub contents (in the present example, the sub contents A1-1-1) from the contents server 305 based on the static preference information acquired by the process at step S110. Contents requested by the user side by the process at step S8 (for example, the contents A1) include a plurality of pieces of contents (A1-1, A1-2, . . . , A1-k [k is an arbitrary natural number equal to or great than 1]) having different stories from each other although they have the same title. Here, from among a plurality of pieces of sub contents which form each of a plurality of pieces of contents (in the present case, from among the top pieces of sub contents A1-1-1, A1-2-1, . . . , A1-k-1 of the plural pieces of contents), one piece of sub contents (in the present case, the sub contents A1-1-1) is selected by the selection control section 304. If the static preference information includes, for example, information that the user does not like horror contents (if the image process of the horror genre in FIG. 8 is "shaded"), then the selection control section 304 selects contents free from horror information (contents wherein a horror scene is shaded or a scene of a horror story is replaced by another scene) from among the plural pieces of contents recorded in the contents server 305.

In particular, the contents server 305 has recorded therein contents A1-1 to A1-k having different stories from each other although they have similar contents, and the selection control section 304 selects, from among the plural pieces of contents having different stories from each other, that piece of contents which has a story conforming to the preference of the user (and then, the contents server 305 successively selects the pieces of the sub contents in the contents A1-1).

Figure 9:
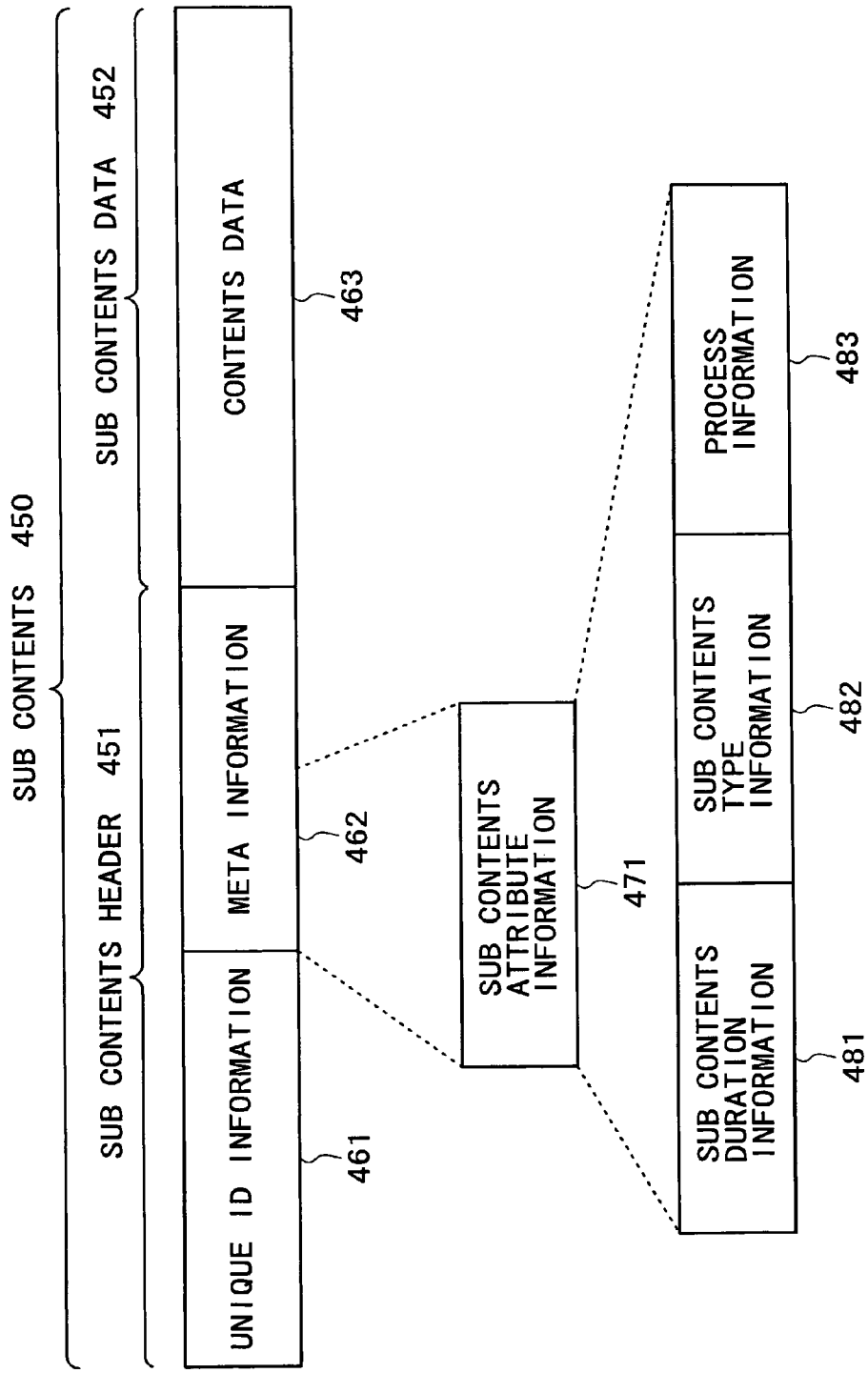
FIG. 9 is a diagrammatic view illustrating an example of a configuration of sub contents.

At step S113, the meta information acquisition section 307 acquires meta information 462 from such sub contents 450 as illustrated in FIG. 9 (in the present example, from sub contents corresponding to the sub contents A1-1-1). In the example of FIG. 9, the sub contents 450 are formed from a sub contents header 451 and contents data 452. The sub contents header 451 is formed from unique ID information 461 and meta information 462. The meta information 462 at least includes sub contents attribute information 471. The sub contents attribute information 471 includes sub contents duration information 481, sub contents type information 482, and process information 483.

A frame of the unique ID information 461 has an identification number for specifying the sub contents 450 placed therein. A frame of the sub contents duration information 481 has a duration of the contents data 452 placed therein. A frame of the sub contents type information 482 has a type (genre) of contents placed therein and further has information for explaining the sub contents (for example, information representative of what degree of horror is provided by the sub contents) placed therein. A frame of the process information 483 has information relating to a processing method for the contents data 452 placed therein. The information relating to the processing method placed in the frame of the process information 483 is not information of the processing method determined by the QoS controller 308 at step S111 of FIG. 6 described hereinabove but information of a processing method set in advance in the sub contents 450. A frame of the contents data 452 has data of the sub contents placed herein.

In the example of FIG. 9, the frame of the meta information 462 at least includes a frame of the sub contents attribute information 471 which in turn includes such a frame of the sub contents duration information 481, another frame of the sub contents type information 482, and a further frame of the process information 483 as described above.

As described hereinabove, one piece of contents (for example, one piece of contents requested at step S109 of FIG. 6) includes a plurality of pieces of sub contents (sub contents 450). More particularly, k pieces of the contents A1-1 to A1-k correspond to one piece of contents A1. Further, the contents A1-1 include sub contents A1-1-1 to A1-1-m; the contents A1-2 include sub contents A1-2-1 to A1-2-m; and contents A1-k include sub contents A1-k-1 to A1-k-m. Since the contents A1-3 to A1-(k-1) are similar to them, description thereof is omitted herein to avoid redundancy. The contents A1-1 to A1-k have different stories from each other, and for example, if all of the sub contents A1-1-1 to A1-1-m are reproduced, then the one contents A1-1 of the same story are obtained. It is to be noted that the sub contents may have different stories from each other such that the story of the sub contents A1-1-1 is followed by the sub contents A1-3-2 and further by the sub contents A1-k-3 whereas the selection control section 304 selects the sub contents.

The sub contents 450 have added thereto a genre and information for explaining the sub contents (sub contents type information 482), and are adjusted based on the information. It is to be noted that the process information 483 included in the meta information 462 is set in advance in the sub contents 450.

Referring back to FIG. 7, at step S114, the QoS controller 308 acquires the meta information 462 (meta information 462 acquired by the meta information acquisition section 307 by the process at step S113) from the meta information acquisition section 307. The meta information 462 includes information relating to the sub contents 450.

At step S115, the QoS controller 308 determines a new processing method based on the processing method determined by the process at step S111 and the processing method placed in the frame of the process information 483 and adjusts (controls) the sub contents 450 based on the determined processing method and the sub contents type information 482. More particularly, the QoS controller 308 joins (merges) the processing method determined by the process at step S111 and the processing method placed in the process information 483 and performs such adjustment as to decrease the sound volume of the sub contents or "shade" the sub contents (in the present example, the sub contents A1-1-1) based on the substance of the sub contents indicated by the sub contents type information 482. Consequently, the sub contents can be adjusted based on the static preference information of the user. It is to be noted that, at this time, a frame outside the control range (which does not require the control) is not controlled (adjusted) but is skipped.

At step S116, the sender section 306 transmits the sub contents (in the present example, the sub contents A1-1-1)

adjusted by the process at step S115 to the user terminal apparatus 21-1 through the network 11. The user terminal apparatus 21-1 receives and reproduces the sub contents. Further, the user terminal apparatus 21-1 extracts dynamic preference information of the user who is viewing the sub contents based on the sub contents and transmits the dynamic preference information to the contents providing apparatus 22-1.

Thus, at step S117, the receiver section 301 of the contents providing apparatus 22-1 receives the dynamic preference information transmitted thereto from the user terminal apparatus 21-1. At step S118, the authentication registration section 302 converts the dynamic preference information into static preference information and performs updating with the static preference information. For example, if the dynamic preference information includes information that the user has a higher degree of fear for horror contents, then the authentication registration section 302 executes such a process as to lower the picture quality for the horror in FIG. 8 to B and updates the picture quality with the static preference information. In the example of FIG. 8, the picture quality with regard to the genre of the horror is changed and updated from A to B.

At step S119, the QoS controller 308 determines a contents processing method again based on the dynamic preference information received by the process at step S117. For example, if the dynamic preference information includes information that the user has a higher degree of fear for a horror scene (a predetermined frame in the sub contents), the QoS controller 308 determines such a processing method as to further lower the picture quality for the horror of FIG. 8. It is to be noted that, while, in the example just described, the QoS controller 308 determines a contents processing method again based on the dynamic preference information, the method of determination is not limited to this. Otherwise a contents processing method may be determined again based on the static preference information and the dynamic preference information. Where the processing method is changed, such a case that the sub contents A1-3-2 is selected next to, the sub contents A1-1-1 as described above sometimes occurs.

At step S120, the selection control section 304 determines whether or not the contents are completed. More particularly, the selection control section 304 determines whether or not all of the plural pieces of sub contents (m sub contents) corresponding to the one piece of contents (contents A1) requested at step S109 of FIG. 6 have been transmitted to the user terminal apparatus 21-1. If it is determined that the contents are not completed, then the processing returns to step S112 to repeat the processes at the steps beginning with step S112. In particular, a piece of sub contents is acquired based on the static preference information, and the sub contents are adjusted based on meta information and the determined method and are transmitted to the user terminal apparatus 21-1. Then, dynamic preference information of the user who views the sub contents is acquired, and a processing method for the sub contents is determined again based on the acquired dynamic preference information. In this manner, the contents are adjusted based on the static preference information and the dynamic preference information and then transmitted to the user terminal apparatus 21-1.

It is to be noted that the process at step S112 in the second and following operation cycles may be modified such that the selection control section 304 selects a next piece of sub contents (for example, the sub contents A1-1-2) based not only on the static preference information but also on information formed by merging the static preference information and the dynamic preference information.

If it is determined at step S120 that the contents are completed, then the receiver section 301 determines at step S121 whether or not a request for next contents is received. If it is determined that a request for next contents is received, then the processing returns to step S111 to repeat the processes at the steps beginning with step S111. On the other hand, if it is determined at step S121 that a request for next contents is not received, then the processing is ended.

Figure 6:
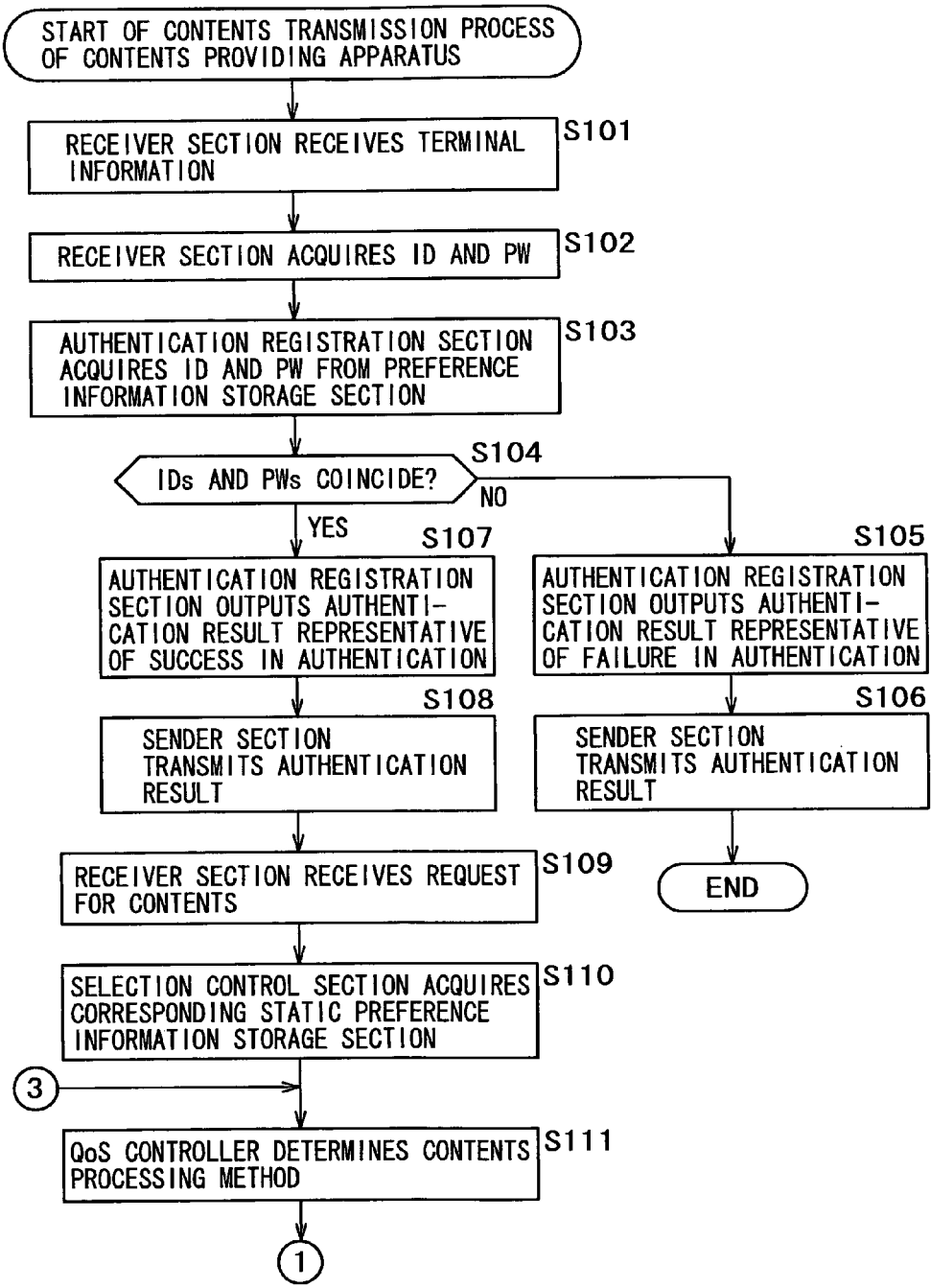
FIGS. 6 and 7 are flow charts illustrating a contents transmission process of the contents providing apparatus of FIG. 3.
Figure 7:
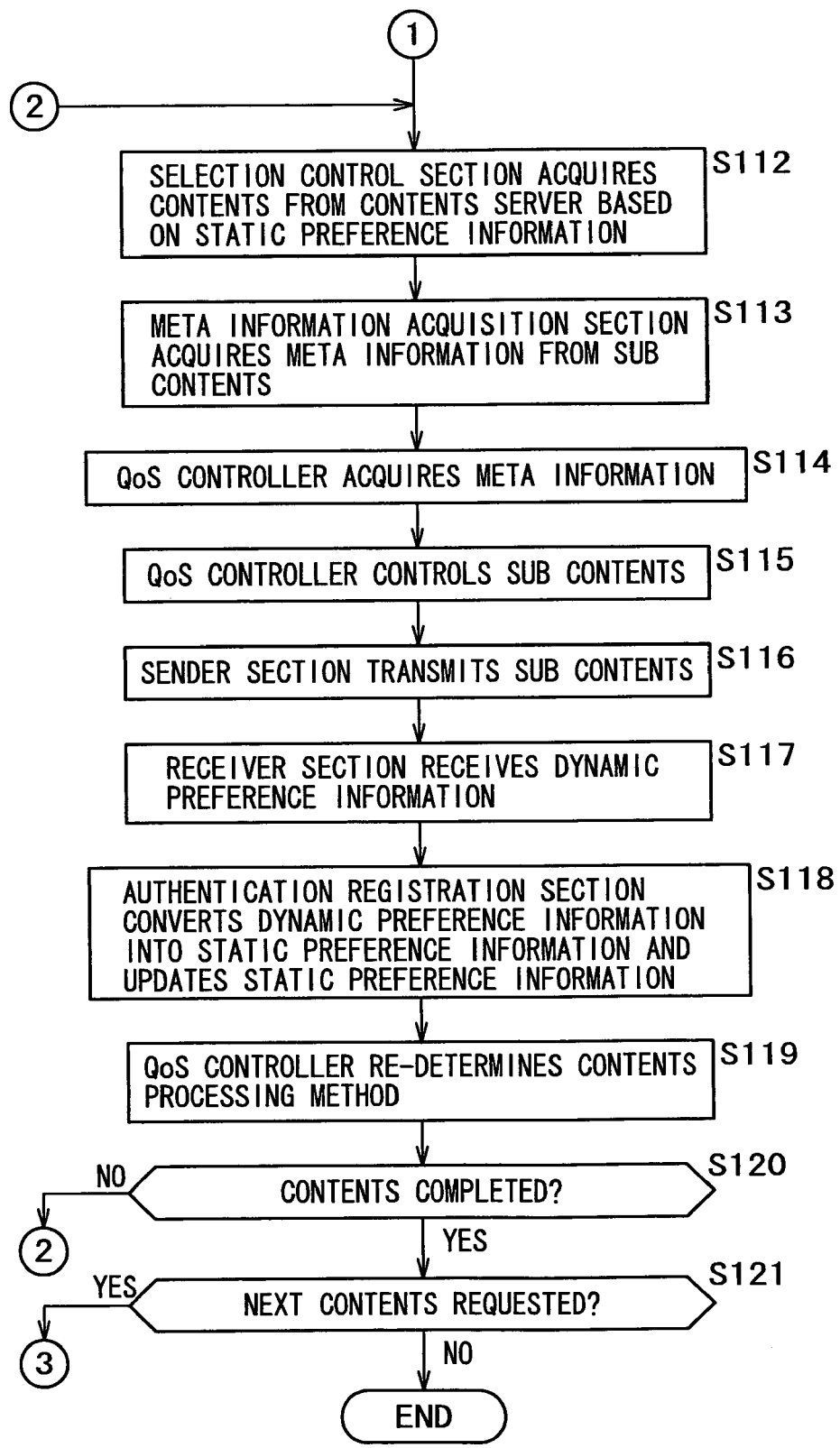

Through the process of FIGS. 6 and 7, contents conforming to the preference of the user are selected from within the contents server 305 based on the meta information 462 of the sub contents and the static preference information. Then, the sub contents are further adjusted based on the static preference information and the process information 483 included in the meta information 462 and transmitted to the user terminal apparatus 21-1. The user terminal apparatus 21-1 side reproduces the sub contents and extracts and transmits dynamic preference information of the user to the contents providing apparatus 22-1. The contents providing apparatus 22-1 adds the dynamic preference information to the static preference information and determines a processing method for the sub contents again based on the dynamic preference information (or the dynamic preference information and the static preference information), and further adjusts the sub contents based on the sub contents processing method.

Consequently, the contents providing apparatus 22-1 can provide sub contents conforming to the user based on the preference information of the user. Further, the contents providing apparatus 22-1 can further adjust the sub contents based on the real-time dynamic preference information of the user and provide the adjusted sub contents.

In other words, according to the first embodiment, the contents providing apparatus 22-1 can provide contents conforming to the static preference of the user and further provide contents conforming to the dynamic preference of the user.

Now, a second embodiment of the present invention is described with reference to FIGS. 10 to 16.

FIG. 10 shows an example of a functional configuration of a user terminal apparatus 21-2 (of the second embodiment) which is an example of the user terminal apparatus 21 of FIG. 1. In the following description, the user terminal apparatus 21 of the second embodiment of the present invention is referred to as user terminal apparatus 21-2. In FIG. 10, like numerals designate corresponding parts in FIG. 2, and detailed description thereof if omitted to avoid redundancy.

Referring to FIG. 10, the user terminal apparatus 21-2 shown includes an inputting section 101, a user preference sensing section 102, a preference information extraction section 103, a sender section 104, a processing section 105, a receiver section 106, a display section 107, and a sound outputting section 108 similar to those of the user terminal apparatus 21-1 described hereinabove with reference to FIG. 2. The user terminal apparatus 21-2 further includes a selection control section 601, a meta information acquisition section 602, and a QoS controller 603.

In short, in the second embodiment, the selection control section 304, meta information acquisition section 307, and QoS controller 308 of the contents providing apparatus 22-1 in the first embodiment are provided in the user terminal apparatus 21-2. In other words, in the second embodiment, control based on dynamic preference information is performed not by the contents providing side (contents providing apparatus 22) but by the user side.

The selection control section 601 selects a corresponding piece of contents from among a plurality of pieces of sub contents and supplies the selected piece of contents to the QoS controller 603. The meta information acquisition section 602 acquires the meta information 462 included in the sub contents 450 and supplies the meta information 462 to the QoS controller 603. The QoS controller 603 determines a processing method for the sub contents based on the meta information and dynamic preference information, adjusts the sub contents based on the processing method, and supplies the sub contents to the display section 107 and the sound outputting section 108.

Figure 11:
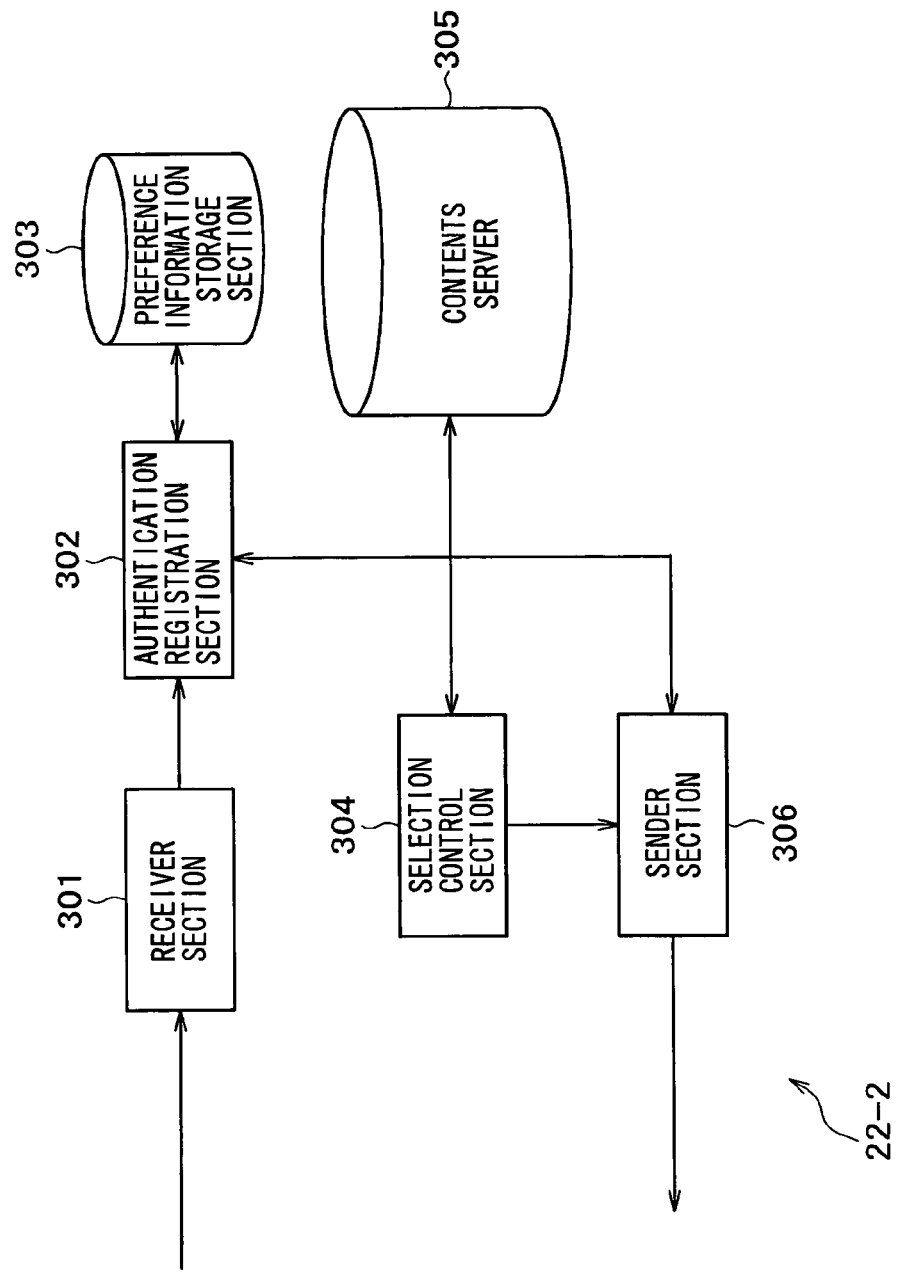
FIG. 11 is a block diagram showing another example of a functional configuration of the contents providing apparatus shown in FIG. 1.

FIG. 11 shows an example of a functional configuration of a contents providing apparatus 22-2 (of the second embodiment) which is an example of the contents providing apparatus 22 of FIG. 1. In the following description, the contents providing apparatus 22 of the second embodiment of the present invention is referred to as contents providing apparatus 22-2. In FIG. 11, like numerals designate corresponding parts in FIG. 3, and detailed description thereof if omitted to avoid redundancy.

Referring to FIG. 11, the contents providing apparatus 22-2 shown includes a receiver section 301, an authentication registration section 302, a preference information storage section 303, a selection control section 304, a contents server 305, and a sender section 306 similar to those of the contents providing apparatus 22-1 described hereinabove with reference to FIG. 3. However, the contents providing apparatus 22-2 includes none of the meta information acquisition section 307 and QoS controller 308 of the contents providing apparatus 22-1. As described hereinabove, in the second embodiment, control based on dynamic preference information is performed not by the contents providing side (contents providing apparatus 22) but by the user side.

Now, processes when the contents providing apparatus 22-2 of FIG. 11 provides contents to the user terminal apparatus 21-2 of FIG. 10 are described with reference to FIGS. 12 to 16. First, a contents reproduction process of the user terminal apparatus 21-2 of FIG. 10 is described with reference to FIGS. 12 to 14. It is to be noted that this process is started when an instruction to start provision of contents is inputted to the inputting section 101 by the user.

At steps S201 to S207, processes similar to those at steps S1 to S7 described hereinabove above with reference to FIG. 4, respectively, are executed. Thus, overlapping description of the processes is omitted herein to avoid redundancy.

At step S208, the processing section 105 issues a request for static preference information. More particularly, the processing section 105 produces a signal for requesting static preference information and outputs the signal to the sender section 104. The sender section 104 transmits the signal for requesting static preference information to the contents providing apparatus 22-2 through the network 11. In response to the signal, the contents providing apparatus 22-2 transmits static preference information corresponding to a user ID authenticated by the process at step S206 to the user terminal apparatus 21-2.

Thus, at step S209, the receiver section 106 receives the static preference information from the contents providing apparatus 22-2 through the network 11.

At step S210, the QoS controller 603 acquires the static preference information from the receiver section 106, and at step S211, the QoS controller 603 determines a contents processing method based on the static preference information. The contents processing method is determined similarly to the contents processing method determined at step S111 of FIG. 6 described hereinabove.

At step S212, the inputting section 101 accepts a request for contents. At step S213, the sender section 104 transmits a signal for requesting contents (for example, the contents A1) to the contents providing apparatus 22 through the network 11. In response to the signal, the contents providing apparatus 22 transmits a plurality of pieces of sub contents (sub contents A1-1-1 to A1-k-1) corresponding to the request contents. The request contents (For example, the contents A1) include a plurality of pieces of contents (A1-1 to A1-k) having different stories from each other although they have the same title. Here, the top pieces of sub contents A1-1-1 to A1-k-1 of the plural pieces of sub contents which form the plural contents are transmitted from the contents providing apparatus 22.

Thus, at step S214, the receiver section 106 receives a plurality of pieces of sub contents (sub contents A1-1-1 to A1-k-1).

At step S215, the selection control section 601 selects one piece of sub contents (for example, the sub contents A1-1-1) from among the plural pieces of sub contents received by the receiver section 106. Since the plural pieces of sub contents (contents A1-1 to A1-k) received by the process at step S214 have different stories from each other, the selection control section 601 selects one piece of sub contents from among the plural pieces of sub contents. More particularly, even if the contents are same (contents A1), since the top pieces of sub contents (sub contents A1-1-1 to A1-k-1) of the plural pieces of sub contents (contents A1-1 to A1-k) as viewed from different angles as in the multicast contents, the selection control section 601 selects a piece of contents conforming to the user (in the present example, the sub contents A1-1-1) based on the static preference information of the user who is to view. It is to be noted that. In the present process, a piece of sub contents is selected based on the static preference information, but the manner of selection is not limited to this. A piece of sub contents may otherwise be selected based on the static preference information only when the process at step S215 is performed for the first time (that is, when dynamic preference information has been extracted no time). For the second and succeeding times (that is, after dynamic preference information is extracted), a piece of sub contents is selected based on dynamic preference information and static preference information.

It is to be noted that, at steps S216 to S218, processes similar to those at steps S113 to S115 described hereinabove with reference to FIG. 7, respectively, and description thereof is omitted herein to avoid redundancy. Here, only it is different that the processes are executed by the user terminal apparatus 21-2.

Further, the processes at steps S219 to S226 are similar to those at steps S11 to S17 described hereinabove with reference to FIG. 7, respectively, and therefore, overlapping description of them is omitted herein to avoid redundancy.

Figure 12:
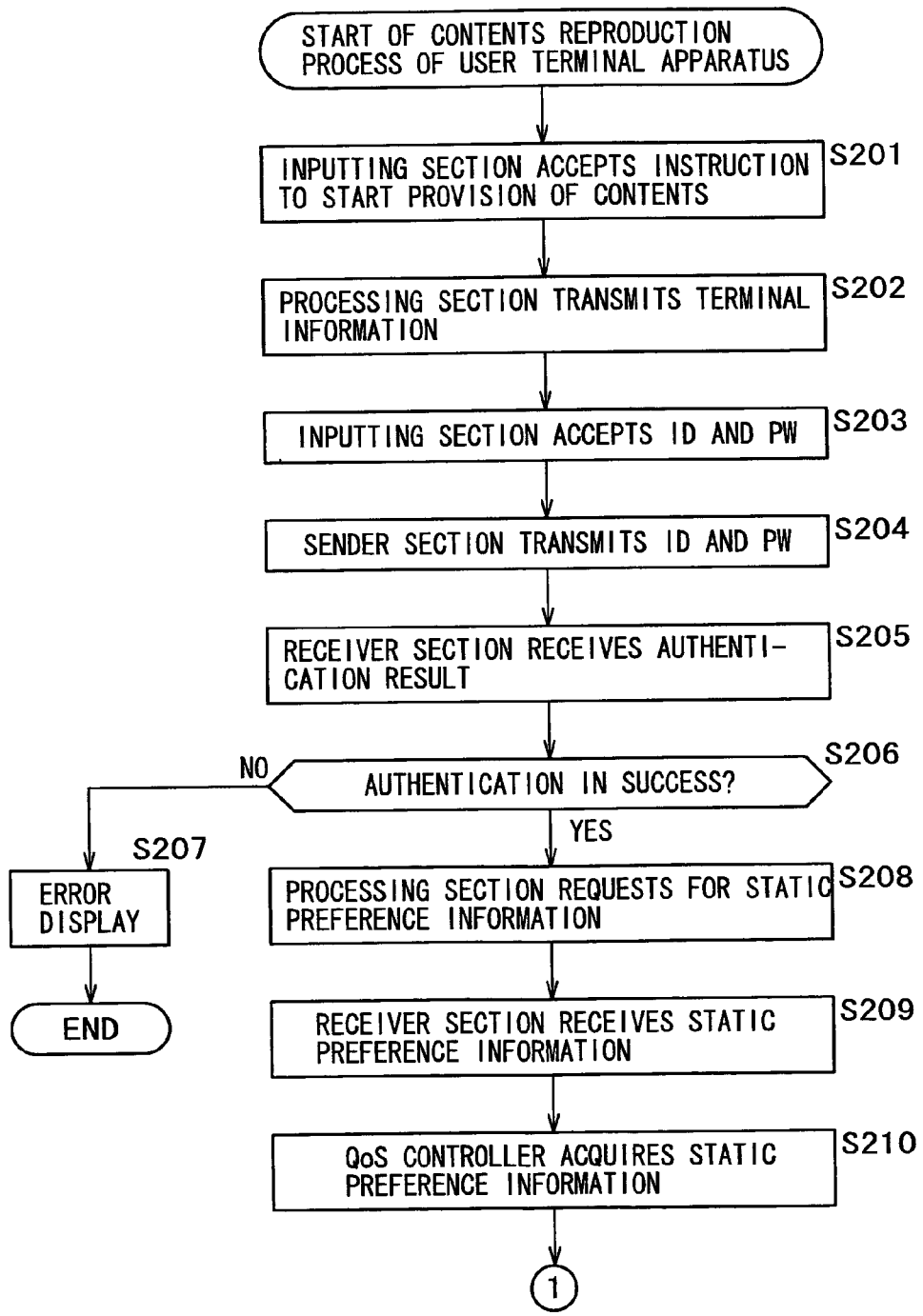
FIGS. 12, 13, and 14 are flow charts illustrating a contents reproduction process of the user terminal apparatus of FIG. 10.
Figure 13:
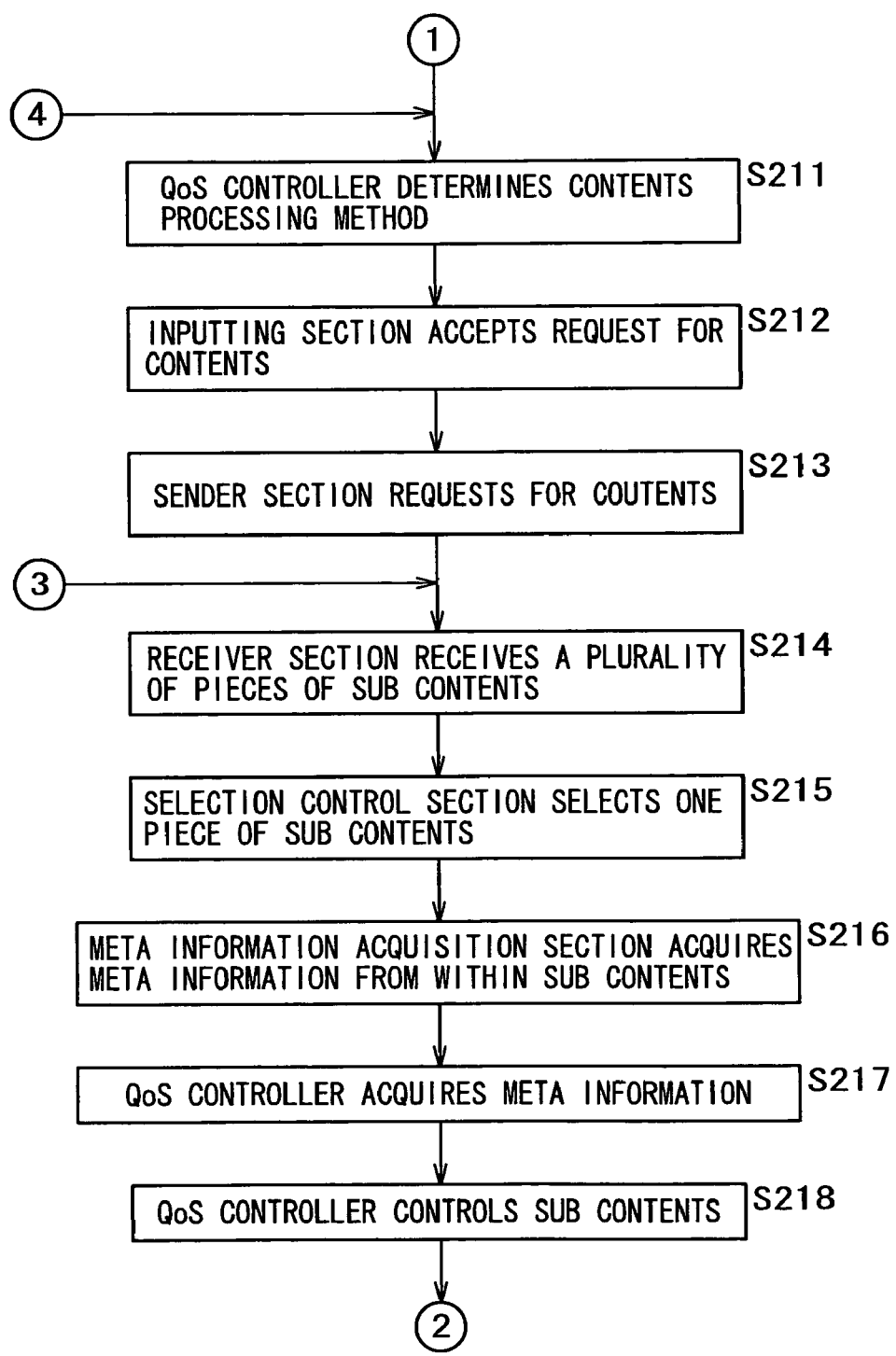
Figure 14:
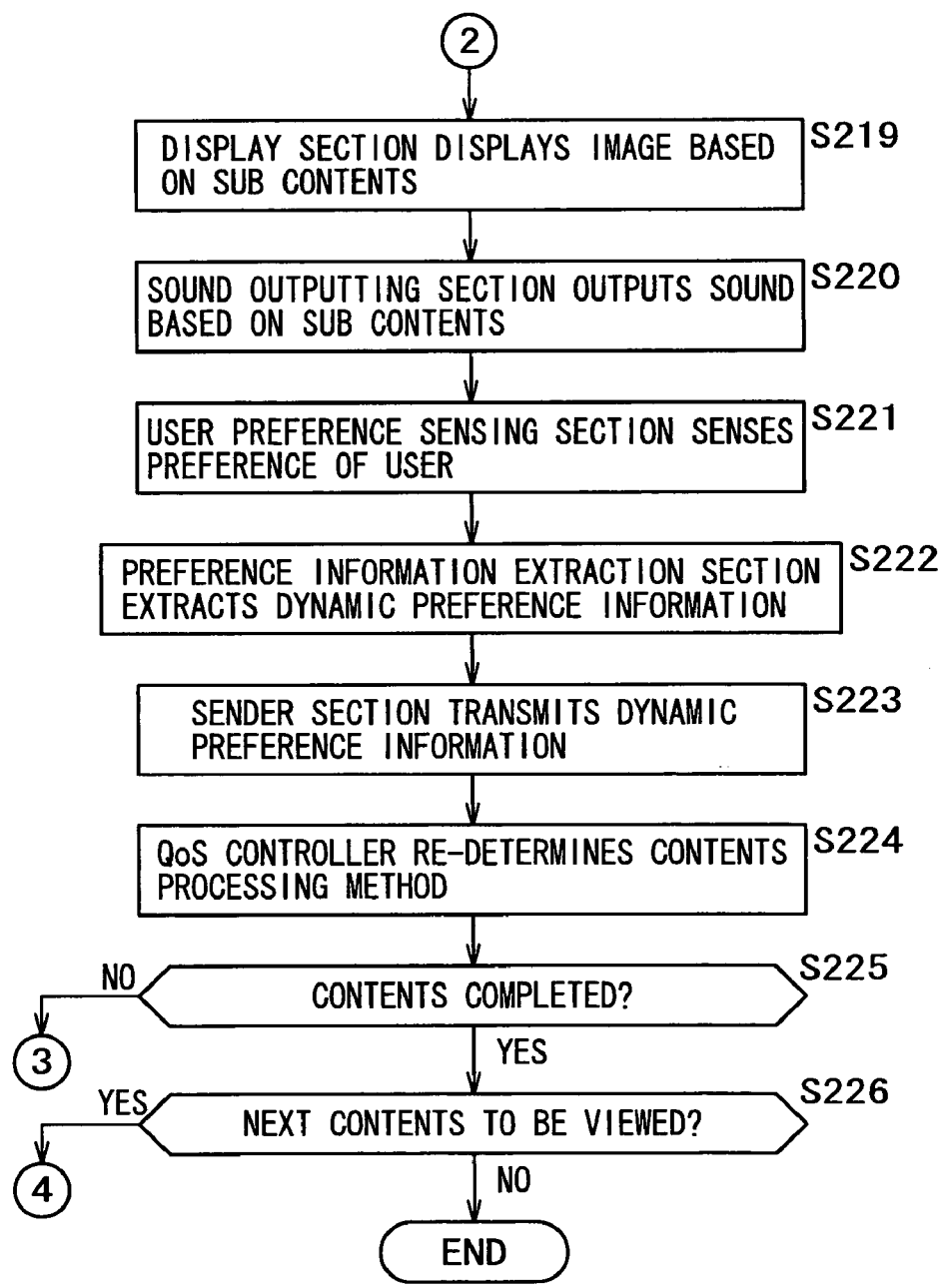

Through the process of FIGS. 12 to 14, contents to be viewed by the user are selected based on the preference information of the user (the static preference information or the static preference information and the dynamic preference information) and dynamic preference information is extracted with regard to the contents being actually viewed by the user, and the contents are adjusted based on the dynamic preference information. Consequently, contents conforming to the preference of the user can be provided.

Now, a contents providing process of the contents providing apparatus 22-2 of FIG. 11 corresponding to the process of the user terminal apparatus 21-2 illustrated in FIGS. 12 to 14 is described with reference to FIGS. 15 and 16.

Figure 15:
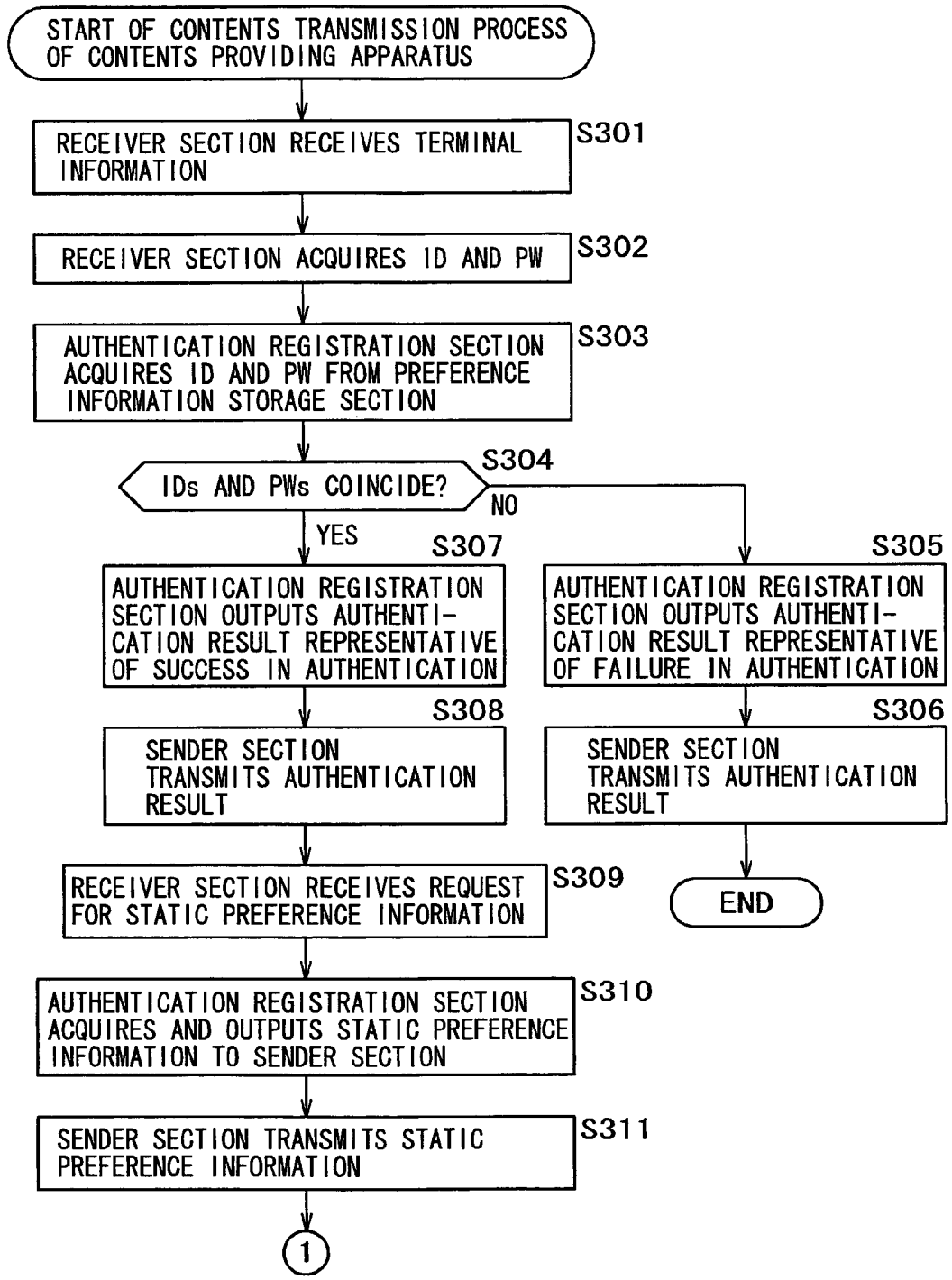
FIGS. 15 and 16 are flow charts illustrating a contents transmission process of the contents providing apparatus of FIG. 11.

Referring first to FIG. 15, at steps S301 to 308, processes similar to those at steps S101 to S108 described hereinabove with reference to FIG. 6 are executed, respectively. Thus, description of the processes is omitted herein to avoid redundancy, and the following description begins with the description of a process at step S309.

If the user terminal apparatus 21-2 determines that authentication results in success at step S206 of FIG. 12, then it issues a request for static preference information at step S207. Thus, at step S309, the receiver section 301 receives the request for static preference information. At step S310, the authentication registration section 302 acquires static preference information corresponding to the user ID whose authentication results in success at step S304 based on the request for static preference information and supplies the acquired static preference information to the sender section 306.

At step S311, the sender section 306 transmits the static preference information to the user terminal apparatus 21-2 through the network 11.

Thereafter, the user terminal apparatus 21-2 transmits a request for contents (at step S213 of FIG. 13 described hereinabove), and therefore, the receiver section 301 of the contents providing apparatus 22-2 receives the request for contents.

At step S313, the selection control section 304 selects and acquires a plurality of pieces of sub contents (sub contents A1-1-1 to A1-k-1) correcting to the pertaining contents (for example, contents A1) from the contents server 305. The requested contents (for example, contents A1) include a plurality of pieces of contents (for example, the contents A1-1, contents A1-2, . . . , contents A1-k [k is a natural number equal to or greater than 1]) having different stories from each other, although they have the same title as described hereinabove. Therefore, the top pieces of sub contents (for example, the sub contents A1-1-1 to A1-k-1) of the corresponding plural pieces of sub contents are selected.

At step S314, the sender section 306 transmits the selected plural pieces of sub contents to the user terminal apparatus 21-2 through the network 11. In response to the thus transmitted plural pieces of sub contents, the user terminal apparatus 21-2 selects and reproduces one piece of sub contents (in the present example, the sub contents A1-1-1) from among the received plural pieces of sub contents (at step S215 of FIG. 13) and extracts dynamic preference information of the user who is viewing the sub contents (at step S222 of FIG. 14) and then transmits the extracted dynamic preference information to the contents providing apparatus 22-2 (at step S223 of FIG. 14).

Thus, at step S315, the receiver section 301 receives and supplies the dynamic preference information to the authentication registration section 302. At step S316, the authentication registration section 302 converts the dynamic preference information into static preference information and updates the static preference information stored in the preference information storage section 303 with the thus converted static preference information. Because this process is similar to that described at step 118 in FIG. 7, the detailed description is omitted.

At steps S317 and S318, processes similar to those at steps S120 and S121 described hereinabove with reference to FIG. 7, respectively, and overlapping description thereof is omitted herein.

Figure 16:
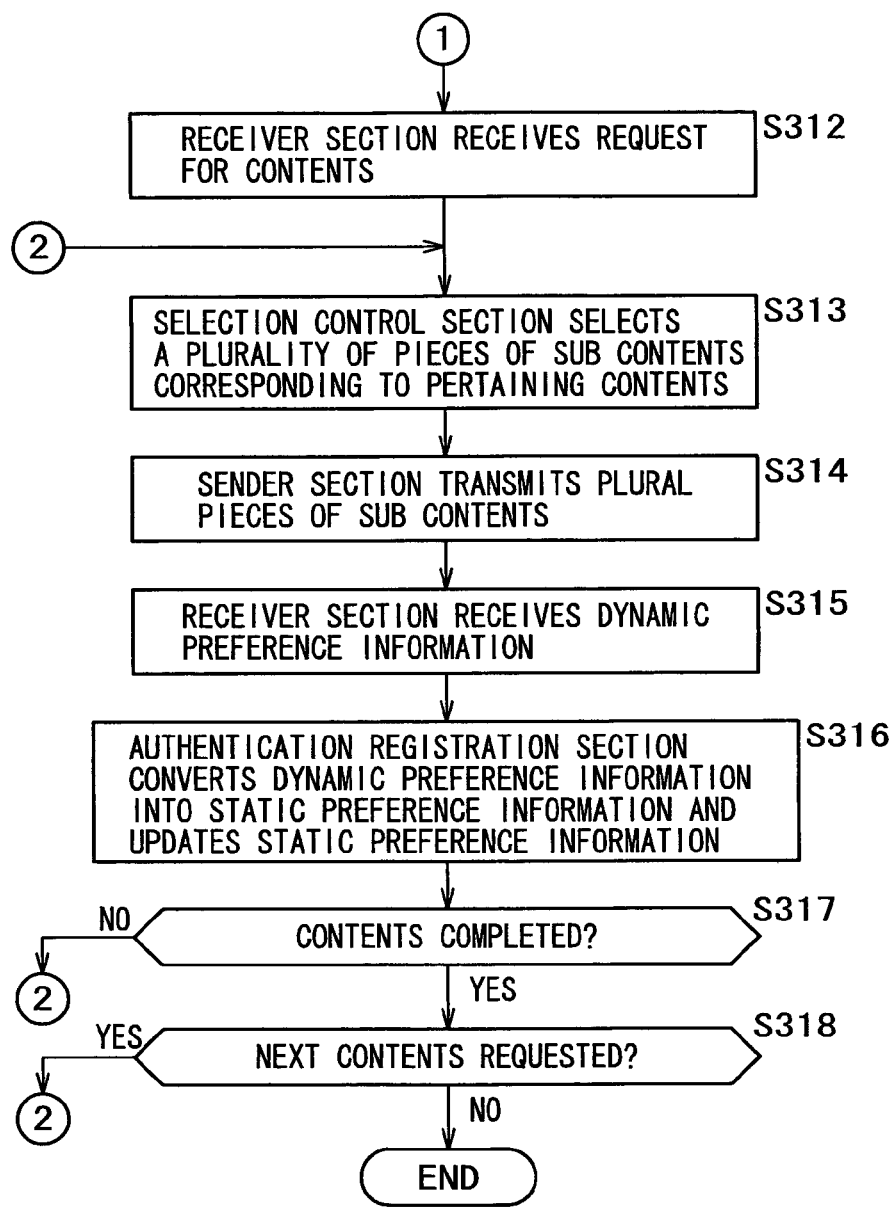

Through the process of FIGS. 15 and 16, the contents providing apparatus 22-2 transmits static preference information to the user terminal apparatus 21-2 and transmits a plurality of pieces of sub contents corresponding to contents requested from the user terminal apparatus 21-2 to the user terminal apparatus 21-2. In other words, control of contents can be performed by the user side.

Through the processes of FIGS. 12 to 16, the user terminal apparatus 21-2 receives static preference information from the contents providing apparatus 22-2 and further receives a plurality of pieces of contents, and can select sub contents conforming to the preference of the user based on the static preference information. Further, the sub contents can be adjusted based on real-time dynamic preference information of the user for the contents being reproduced.

In short, according to the second embodiment, the user terminal apparatus 21-2 can select contents conforming to the preference of the user and can adjust the contents so as to conform to dynamic preference of the user.

In the following, a third embodiment of the present invention is described with reference to FIGS. 17 to 21.

FIG. 17 shows an example of a functional configuration of a user terminal apparatus 21-3 (of the third embodiment) which is an example of the user terminal apparatus 21 of FIG. 1. In the following description, the user terminal apparatus 21 of the third embodiment of the present invention is referred to as user terminal apparatus 21-3. In FIG. 17, like numerals designate corresponding parts in FIG. 2 (or FIG. 10), and detailed description thereof if omitted to avoid redundancy.

Referring to FIG. 17, the user terminal apparatus 21-3 shown includes an inputting section 101, a user preference sensing section 102, a preference information extraction section 103, a sender section 104, a processing section 105, a receiver section 106, a display section 107, and a sound outputting section 108 similar to those of the user terminal apparatus 21-1 described hereinabove with reference to FIG. 2. The user terminal apparatus 21-3 further includes a meta information acquisition section 602 and a QoS controller 603. In other words, the user terminal apparatus 21-3 includes all components of the user terminal apparatus 21-2 of FIG. 10 except the selection control section 601.

In short, in the third embodiment, the meta information acquisition section 307 and QoS controller 308 of the contents providing apparatus 22-1 in the first embodiment are provided in the user terminal apparatus 21-3. Therefore, control based on dynamic preference information is performed not only by the contents providing side (contents providing apparatus 22) but also by the user side.

The meta information acquisition section 602 acquires the meta information 462 included in the sub contents 450 and supplies the meta information 462 to the QoS controller 603. The QoS controller 603 determines a processing method for the sub contents based on the meta information and dynamic preference information, adjusts the adjusted sub contents based on the processing method, and supplies the sub contents to the display section 107 and the sound outputting section 108.

Figure 18:
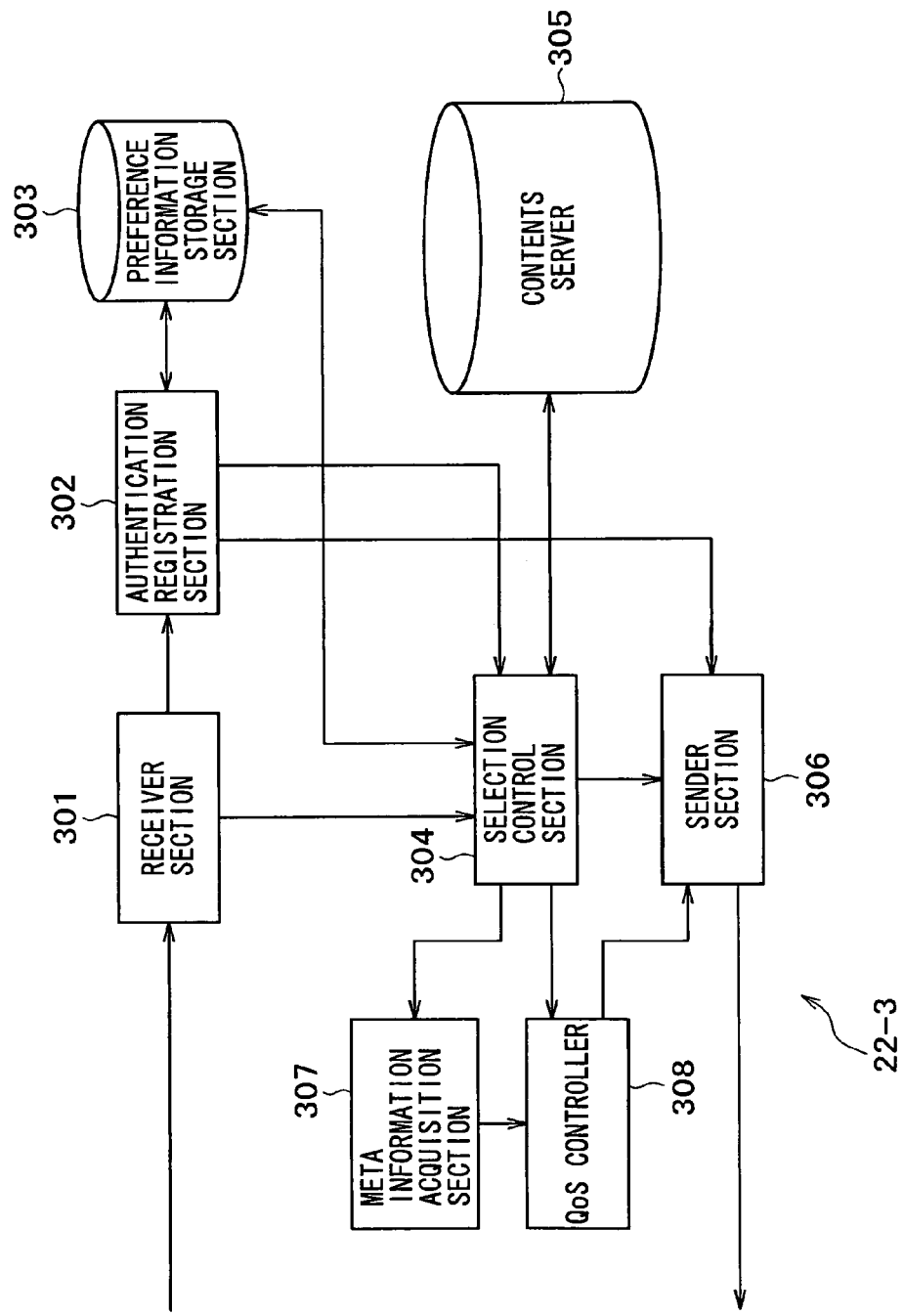
FIG. 18 is a block diagram showing a further example of a functional configuration of the contents providing apparatus shown in FIG. 1.

FIG. 18 shows an example of a functional configuration of a contents providing apparatus 22-3 (of the third embodiment) which is an example of the contents providing apparatus 22 of FIG. 1. In the following description, the contents providing apparatus 22 of the third embodiment of the present invention is referred to as contents providing apparatus. 22-3. In FIG. 18, like numerals designate corresponding parts in FIG. 3 (or FIG. 11), and detailed description thereof if omitted to avoid redundancy.

Referring to FIG. 18, the contents providing apparatus 22-3 has a configuration similar to that of the contents providing apparatus 22-1 of FIG. 3. Further, as described hereinabove, in the third embodiment, control (adjustment) based on dynamic preference information is performed not only by the contents providing side (contents providing apparatus 22) but also by the user side (user terminal apparatus 21-3).

Now, a contents reproduction process of the user terminal apparatus 21-3 of FIG. 17 is described with reference to FIGS. 19 to 21. It is to be noted that this process is started when an instruction to start provision of contents is inputted to the inputting section 101 by the user.

At steps S401 to S410, processes similar to those at steps S1 to S10 described hereinabove above with reference to FIGS. 4 and 5, respectively, are executed. Thus, overlapping description of the processes is omitted herein to avoid redundancy.

At step S411, the QoS controller 603 acquires the meta information 462 from the sub contents 450 (FIG. 8). At step S412, the QoS controller 603 adjusts (controls) the sub contents 450 based on the process information 483 and the sub contents type information 482.

At steps S413 to S417, processes similar to those at steps S11 to S15 of FIG. 5 are executed, and overlapping description of them is omitted herein to avoid redundancy.

At step S418, the QoS controller 603 determines a contents processing method based on the dynamic preference information. In particular, after one piece of sub contents (in the present example, the sub contents A1-1-1) is reproduced (after the sub contents received at step S410 for the first time are reproduced), sub contents (in the present example, the contents A1-2) are adjusted based on dynamic preference information of the user having viewed the one piece of sub contents and the process information 483 included in the meta information 462.

At steps S419 and S420, processes similar to those at steps S16 and S17 described hereinabove with reference to FIG. 5 are executed, and overlapping description of them is omitted herein to avoid redundancy.

While, in the process corresponding to the process at step S314 of FIG. 16 described hereinabove (in the second embodiment), a plurality of pieces of sub contents are transmitted from the contents providing side, in the third embodiment, one piece of sub contents is selected from among a plurality of pieces of sub contents from the contents providing side. In other words, the process of selecting a piece of sub contents from among a plurality of pieces of sub contents is executed by the contents providing apparatus 22-3.

Figure 20:
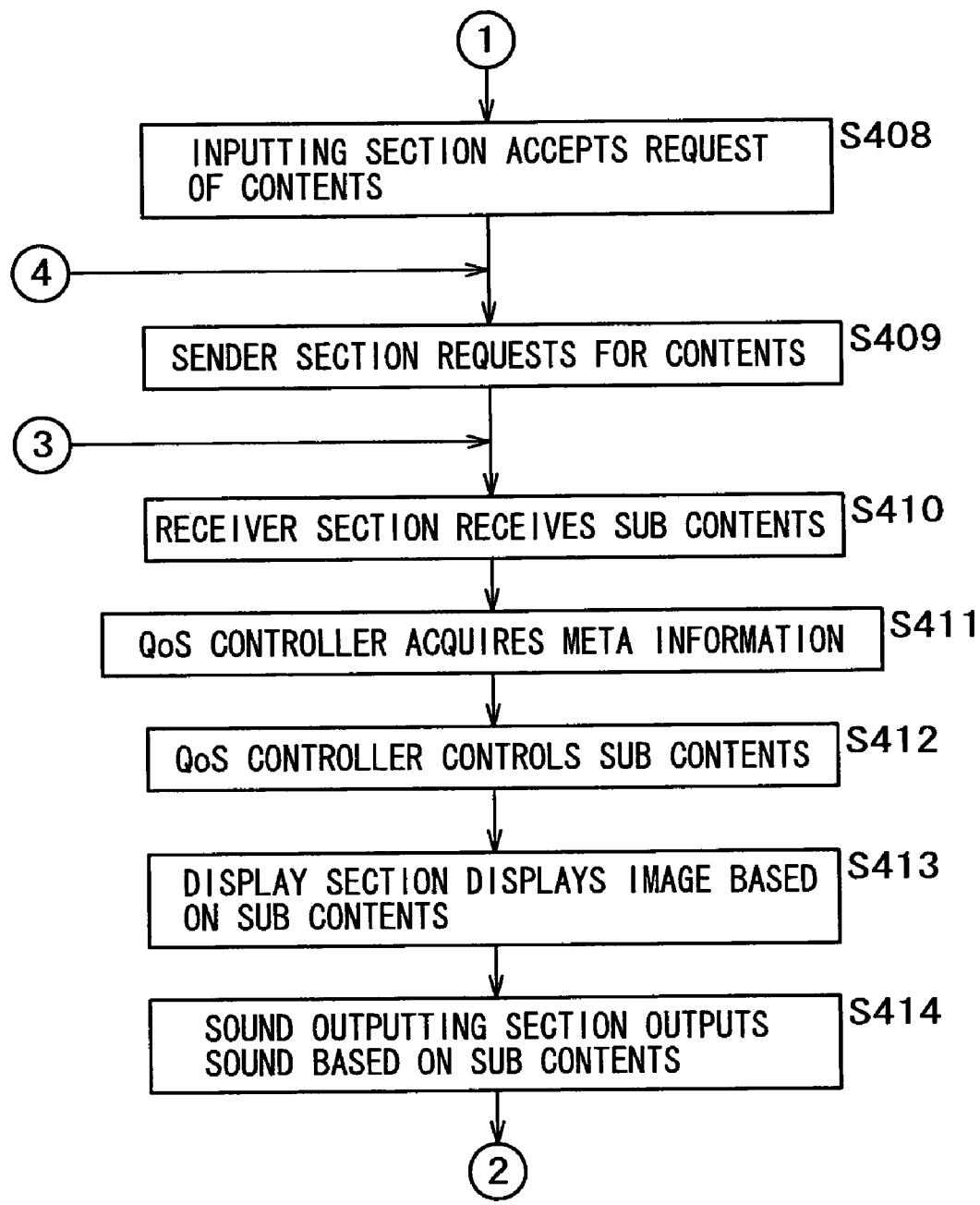
Figure 21:
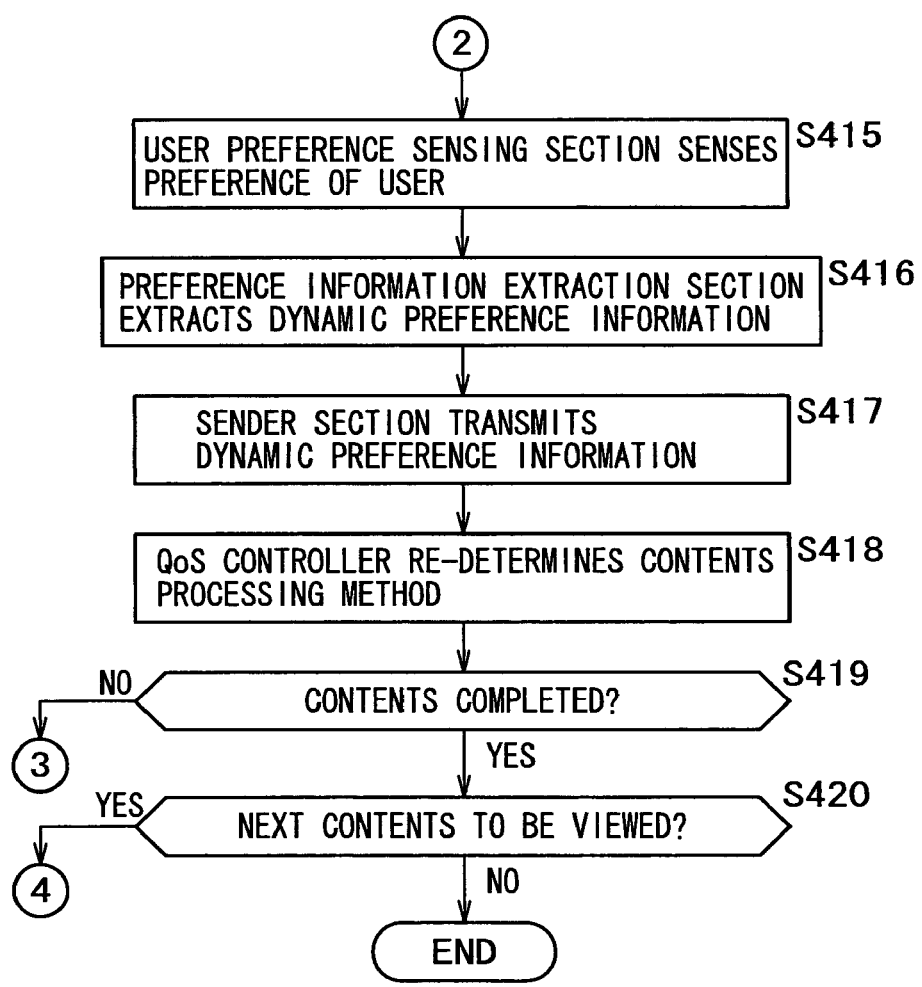

Through the process of FIGS. 19 to 21, dynamic preference information of the user for sub contents being actually viewed by the user is extracted, and the sub contents are adjusted based on the dynamic preference information. Consequently, contents conforming to the preference of the user can be reproduced.

The process of the contents providing apparatus 22-3 corresponding to the process of FIGS. 19 to 21 is similar to that described hereinabove with reference to FIGS. 6 and 7, and overlapping detailed description of the process is omitted herein to avoid redundancy. In the process of FIGS. 6 and 7, sub contents are selected based on static preference information, and then the sub contents are adjusted based on dynamic preference information. However, in the process of the contents providing apparatus 22-3 corresponding to the process of FIGS. 19 to 21, the QoS controller 603 need not necessarily adjust sub contents based only on dynamic preference information but the contents may be adjusted based only on static preference information. Then, when the provision of one piece of contents is completed (for example, when the determination at step S120 of FIG. 7 is YES), the dynamic preference information may be placed into the static preference information to update the static preference information.

According to the third embodiment of the present invention, the contents providing apparatus 22-3 can select sub contents based on static preference information (and dynamic preference information) of the user and adjust and transmit the sub contents to the user terminal apparatus 21-3. In other words, the contents providing apparatus 22-3 can provide contents conforming to the preference of the user. Meanwhile, the user terminal apparatus 21-3 can reproduce received sub contents, extract dynamic preference information of the user, and then adjust the sub contents based on the extracted dynamic preference information. In other words, also the user terminal apparatus 21-3 can reproduce contents conforming to the preference of the user.

Through the process described above, contents are selected and provided based on static preference information of the user set in advance, and the contents are adjusted based on dynamic preference information (a feeling) of the user who views the reproduced contents. Consequently, contents conforming to the user can be provided.

Further, since the picture quality, sound quality, and story of contents are varied based on static preference information registered in advance so that optimum contents (information) are selected or processed (adjusted) and provided to each user, personalized contents which provide a higher degree of satisfaction than ever can be provided to the user.

Furthermore, useless network traffic can be suppressed. Further, since contents which the user does not desire are not provided, contents can be provided efficiently.

Furthermore, since the static preference information of a user includes also the preference of the picture quality or the preference of the cost, it is possible to cause the picture quality to be linked to the cost to control the network band so that it may not be used excessively. Consequently, since the user can acquire contents within a range of the cost desired by the user itself, the degree of satisfaction of the user can be raised.

Further, even if the same user accesses from various apparatus, since also terminal identification information is transmitted from the user side to the providing side (in the present example, the contents providing apparatus 22) together with authentication information of the individual, the providing side can provide optimum contents in accordance with the apparatus.

Furthermore, for example, where it is tried to prevent a violence scene from being observed by a child, if this is registered as static preference information, then a system which cuts or does not provide such a scene can be constructed.

Further, as described hereinabove in connection with the first embodiment, the contents providing apparatus 22-1 can select and provide contents based on static preference information of a user set in advance and can further acquire dynamic preference information (a feeling) of the user who views the reproduced contents and adjust the contents. In short, the providing side of contents can provide contents conforming to the user.

Furthermore, as described hereinabove in connection with the second embodiment, the user terminal apparatus 21-2 can acquire static preference information of a user set in advance and select a piece of contents from among a plurality of pieces of received contents based on the acquired static preference information. Further, the user terminal apparatus 21-2 can extract dynamic preference information (a feeling) of the user who views the reproduced contents and adjusts the contents based on the dynamic preference information. In short, the user terminal apparatus 21-2 can adjust contents conforming to the user.

Further, as described hereinabove in connection with the third embodiment, the contents providing apparatus 22-3 can select and provide contents based on static preference information of a user set in advance while the user terminal apparatus 21-3 can acquire dynamic preference information (a feeling) of the user who views the reproduced contents and adjust the contents. In short, each of the contents providing side and the user terminal side can adjust contents conforming to the user.

It is to be noted that, while, in the examples described above, authentication of an individual is performed based on an ID and a PW, the authentication of an individual is not limited to this, and any countermeasure may be used only if an individual can be specified such as, for example, a contactless ID card, an IC card, verification of a fingerprint, or image recognition (for example, a characteristic of the face is read to perform authentication). Further, local authentication which is performed by the user terminal apparatus 21 may be used.

Furthermore, the user preference sensing section 102 may further include an infrared sensor. Where the user preference sensing section 102 includes an infrared sensor, for example, when the user leaves a predetermined position (for example, from forwardly of the display section 107), the provision of contents is stopped temporarily, the provision of contents is stopped and contents of another story are provided, or else the contents are provided with the picture quality lowered.

Further, the user preference sensing section 102 is not limited to such sensing elements as described above, but any sensing element may be used only if it can sense the preference of the user. For example, when the user preference sensing section 102 detects a variation of the pressure of a seat, the preference information extraction section 103 may detect whether the user observes the display section 107 in a forwardly inclined posture or in a relaxed condition. Further, for example, the user preference sensing section 102 may measure the brain wave of the user, and the preference information extraction section 103 may determine that the user is relaxed if an alpha wave is found.

Furthermore, registration of static preference information may be performed through the Internet. The user would input static preference information based on a Web (World Wide Web) screen which urges the user to input preference information. The static preference information may be accumulated not in the preference information storage section 303 of FIG. 3 but otherwise in a database on a network (Internet). In this instance, the user terminal apparatus 21 or the contents providing apparatus 22 acquires preference information from the database through the network.

Further, the QoS controller may control not only images but also sound. The QoS controller perform such control, for example, as to cut a portion of expression which is not educationally preferable or decrease the sound volume.

It is to be noted that, while, in the examples described above, it is described that registration for personal authentication or registration of static preference information is performed in advance, it is naturally possible, when personal authentication results in failure (for example, when the determination at step S6 of FIG. 4 is NO), to cause a registration screen to be displayed on the display section 107 subsequently and then start registration of user information.

Further, the contents to be provided may be any contents only if they are in a layered encoding form (for example, in a scalable distributed form). For example, the contents may be in a form encoded in accordance with the JPEG (Joint Photographic Experts Group) 2000 or in accordance with the MPEG (Moving Picture Experts Group) 4.

Furthermore, the present invention can be applied not only to the contents providing apparatus 22 but also to any providing apparatus only if it can provide contents. Further, the present invention can be applied not only to the user terminal apparatus 21 but also to any reproduction apparatus only if it can provide contents.

While the series of processes described above can be executed by hardware, it may otherwise be executed by software. Where the series of processes described above are executed by software, the processes described above are executed by such an information providing apparatus 35 as shown in FIG. 22.

Referring to FIG. 22, a central processing unit (CPU) 801 executes various processes in accordance with a program stored in a ROM (Read Only Memory) 802 or a program loaded from a storage section 808 into a RAM (Random Access Memory) 803. Also data necessary for the CPU 801 to execute various processes are suitably stored into the RAM 803.

The CPU 801, ROM 802, and RAM 803 are connected to one another by an internal bus 804. Also an input/output interface 805 is connected to the internal bus 804.

The input/output interface 805 is connected to an inputting section 806, an outputting section 807, a storage section 808, and a communication section 809, and an IC card reader/writer (not shown). The inputting section 806 includes a keyboard, a mouse, and so forth. The outputting section 807 includes a display unit which may be a CRT (Cathode Ray Tube) or an LCD (Liquid Crystal Display) unit, a speaker, and so forth. The storage section 808 is formed from a hard disk or the like. The communication section 809 includes a modem and a terminal adapter. The communication section 809 performs a communication process through a network including a telephone network or a CATV.

Further, as occasion demands, a drive 810 is connected to the input/output interface 805. A removable medium 821 such as a magnetic disk, an optical disk, a magneto-optical disk, a semiconductor memory, or the like is suitably loaded into the drive 810. A computer program read from the loaded medium is installed into the storage section 808 as occasion demands.

Where the series of processes are to be executed by software, a program which forms the software is installed from a network or a recording medium.

The recording medium may be formed as a package medium such as, as shown in FIG. 22, a removable medium 821 which has the program recorded thereon and is distributed in order to provide the program to a user separately from a computer. Also, the recording medium may be formed as the ROM 802 or the hard disk including the storage section 808 which has the program recorded thereon and is provided to a user in a form to be incorporated in a computer in advance.

It is to be noted that, in the present specification, the steps which describe the computer programs may be but need not necessarily be processed in a time series in the order as described, and include processes which are executed in parallel or individually without being processed in a time series.

Further, in the present specification, the term "system" is used to represent an entire apparatus composed of a plurality of apparatus.

While preferred embodiments of the present invention have been described using specific terms, such description is for illustrative purposes only, and it is to be understood that changes and variations may be made without departing from the spirit or scope of the following claims.

What is claimed is:

1. A contents providing system, which includes a providing apparatus and a reproduction apparatus, for providing layered encoding contents from the providing apparatus to the reproduction apparatus over a network, comprising:

storage means for storing first preference information representative of a preference of a user, the first preference information indicating a reproduction quality for at least one genre of the contents and at least one type of apparatus of the user, and indicating a separate cost associated with each genre and each type of apparatus listed in the first preference information for controlling a network band of the network, wherein the first preference information includes information of a picture quality, image process, sound quality and CPU processing capacity associated with each of the genres and the types of apparatuses listed in the first preference information;

selection means for selecting contents based on the first preference information stored in said storage means, said contents including a plurality of sub-contents;

reproduction means for reproducing the contents selected by said selection means by reproducing respective ones of the plurality of sub-contents;

detection means for detecting second preference information representative of a preference of the user for one of the plurality of sub-contents reproduced by said reproduction means, said second preference information being based on a reaction of the user which is detected during reproduction of the one of the plurality of sub-contents; and adjustment means for adjusting the contents during the reproducing of the contents by the reproduction means, by adjusting a level of reproduction quality to be used when reproducing the one of the plurality of sub-contents for the user based on the first preference information and adjusting the level of reproduction quality to be used when reproducing another one of the plurality of sub-contents based on the second preference information detected for the one of the plurality of sub-contents.

2. A contents providing method implemented on a contents providing system, which includes a providing apparatus and a reproduction apparatus, for providing layered encoding contents from the providing apparatus to the reproduction apparatus over a network, comprising:

selecting, at the content providing apparatus, contents based on first preference information stored in advance and representative of a preference of a user, said contents including a plurality of sub-contents, the first preference information indicating a reproduction quality for at least one genre of the contents and at least one type of apparatus of the user, and indicating a separate cost associated with each genre and each type of apparatus listed in the first preference information for controlling a network band of the network, wherein the first preference information includes information of a picture quality, image process, sound quality and CPU processing capacity associated with each of the genres and the types of apparatuses listed in the first preference information;

reproducing, at the reproduction apparatus, the contents selected by reproducing respective ones of the plurality of sub-contents;

detecting, at the reproduction apparatus, second preference information representative of a preference of the user for one of the plurality of sub-contents reproduced, said second preference information being based on a reaction of the user which is detected during reproduction of the one of the plurality of sub-contents; and adjusting, at the content providing apparatus, the contents during the reproducing of the contents, by adjusting a level of reproduction quality to be used when reproducing the one of the plurality of sub-contents for the user based on the first preference information and adjusting the level of reproduction quality to be used when reproducing another one of the plurality of sub-contents based on the second preference information detected for the one of the plurality of sub-contents.

3. A providing apparatus for providing layered encoding contents to a reproduction apparatus over a network, comprising:

first preference information acquisition means for acquiring first preference information stored in advance and representative of a preference of a user, the first preference information indicating a reproduction quality for at least one genre of the contents and at least one type of apparatus of the user, and indicating a separate cost associated with each genre and each type of apparatus listed in the first preference information for controlling a network band of the network, wherein the first preference information includes information of a picture quality, image process, sound quality and CPU processing capacity associated with each of the genres and the types of apparatuses listed in the first preference information;

selection means for selecting contents based on the first preference information acquired by said first preference information acquisition means, said contents including a plurality of sub-contents;

adjustment means for adjusting a level of reproduction quality to be used when reproducing the contents selected by said selection means based on the first preference information;

reproduction means for reproducing the contents adjusted by said adjustment means by reproducing respective ones of the plurality of sub-contents; and second preference information acquisition means for acquiring second preference information representative of a preference of the user for one of the plurality of sub-contents adjusted by said adjustment means, said second preference information being based on a reaction of the user which is detected during reproduction of the one of the plurality of sub-contents;

wherein said adjustment means further adjusts the contents during the reproducing of the contents by the reproduction means, by adjusting the level of reproduction quality to be used when reproducing another one of the plurality of sub-contents based on the second preference information acquired for the one of the plurality of sub-contents.

4. The providing apparatus according to claim 3, further comprising:

meta information acquisition means for acquiring meta information from within the contents selected by said selection means, said adjustment means adjusting the contents based on the first preference information and the meta information.

5. A providing method implemented on a providing apparatus for providing layered encoding contents to a user terminal over a network, comprising:

acquiring, at the providing apparatus, first preference information stored in advance and representative of a preference of a user, the first preference information indicating a reproduction quality for at least one genre of the contents and at least one type of apparatus of the user, and indicating a separate cost associated with each genre and each type of apparatus listed in the first preference information for controlling a network band of the network, wherein the first preference information includes information of a picture quality, image process, sound quality and CPU processing capacity associated with each of the genres and the types of apparatuses listed in the first preference information;

selecting, at the providing apparatus, contents based on the first preference information acquired, said contents including a plurality of sub-contents;

adjusting, at the providing apparatus, a level of reproduction quality to be used when reproducing the contents selected based on the first preference information;

reproducing, at the providing apparatus, the contents by reproducing respective ones of the plurality of sub-contents;

acquiring, at the providing apparatus, second preference information representative of a preference of the user for one of the plurality of sub-contents adjusted, said second preference information being based on a reaction of the user which is detected during reproduction of the one of the plurality of sub-contents; and adjusting, at the providing apparatus, the contents during the reproducing of the contents, by adjusting the level of reproduction quality to be used when reproducing another one of the plurality of sub-contents based on the second preference information acquired for the one of the plurality of sub-contents.

6. A computer readable storage medium encoded with computer executable instructions for providing layered encoding contents to a reproduction apparatus over a network, which when executed by a computer, causes the computer to perform a method comprising:

acquiring first preference information stored in advance and representative of a preference of a user, the first preference information indicating a reproduction quality for at least one genre of the contents and at least one type of apparatus of the user, and indicating a separate cost associated with each genre and each type of apparatus listed in the first preference information for controlling a network band of the network, wherein the first preference information includes information of a picture quality, image process, sound quality and CPU processing capacity associated with each of the genres and the types of apparatuses listed in the first preference information;

selecting contents based on the first preference information acquired, said contents including a plurality of sub-contents;

adjusting a level of reproduction quality to be used when reproducing the contents selected based on the first preference information;

reproducing the contents by reproducing respective ones of the plurality of sub-contents;

acquiring second preference information representative of a preference of the user for one of the plurality of sub-contents adjusted, said second preference information being based on a reaction of the user which is detected during reproduction of the one of the plurality of sub-contents; and adjusting the contents during the reproducing of the contents, by adjusting the level of reproduction quality to be used when reproducing another one of the plurality of sub-contents based on the second preference information acquired for the one of the plurality of sub-contents.

7. A reproduction apparatus for reproducing layered encoding contents received from a providing apparatus over a network, comprising:

preference information acquisition means for acquiring first preference information stored in advance and representative of a preference of a user, the first preference information indicating a reproduction quality for at least one genre of the contents and at least one type of apparatus of the user, and indicating a separate cost associated with each genre and each type of apparatus listed in the first preference information for controlling a network band of the network, wherein the first preference information includes information of a picture quality, image process, sound quality and CPU processing capacity associated with each of the genres and the types of apparatuses listed in the first preference information;

contents acquisition means for acquiring contents to be reproduced, said contents including a plurality of sub-contents;

adjustment means for adjusting a level of reproduction quality to be used when reproducing the contents acquired by said contents acquisition means based on the first preference information;

reproduction means for reproducing the contents adjusted by said adjustment means by reproducing respective ones of the plurality of sub-contents; and detection means for detecting second preference information representative of a preference of the user for one of the plurality of sub-contents reproduced by said reproduction means, said second preference information being based on a reaction of the user which is detected during reproduction of the one of the plurality of sub-contents;

wherein the adjustment means further adjusts the contents during the reproducing of the contents by the reproduction means, by adjusting a level of reproduction quality to be used when reproducing another one of the plurality of sub-contents based on the second preference information detected for the one of the plurality of sub-contents.

8. The reproduction apparatus according to claim 7, wherein said contents acquisition means includes contents selection means for selecting contents based on the first preference information.

9. The reproduction apparatus according to claim 7, further comprising:

meta information acquisition means for acquiring meta information from within the contents acquired by said contents acquisition means, said adjustment means adjusting the contents based on the first preference information and the meta information.

10. A reproduction method implemented on a reproduction apparatus for reproducing layered encoding contents received from a providing apparatus over a network, comprising:

acquiring, at the reproduction apparatus, first preference information stored in advance and representative of a preference of a user, the first preference information indicating a reproduction quality for at least one genre of the contents and at least one type of apparatus of the user, and indicating a separate cost associated with each genre and each type of apparatus listed in the first preference information for controlling a network band of the network, wherein the first preference information includes information of a picture quality, image process, sound quality and CPU processing capacity associated with each of the genres and the types of apparatuses listed in the first preference information;

acquiring, at the reproduction apparatus, contents to be reproduced, said contents including a plurality of sub-contents;

adjusting, at the reproduction apparatus, a level of reproduction quality to be used when reproducing the contents acquired based on the first preference information;

reproducing, at the reproduction apparatus, the contents adjusted, by reproducing respective ones of the plurality of sub-contents;

acquiring, at the reproduction apparatus, second preference information representative of a preference of the user for one of the plurality of sub-contents adjusted, said second preference information being based on a reaction of the user which is detected during reproduction of the one of the plurality of sub-contents; and adjusting, at the reproduction apparatus, the contents during the reproducing of the contents, by adjusting a level of reproduction quality to be used when reproducing another one of the plurality of sub-contents based on the second preference information acquired for the one of the plurality of sub-contents.

11. A computer readable storage medium encoded with computer executable instructions for reproducing layered encoding contents received from a content providing apparatus over a network, which when executed by a computer, causes the computer to perform a method comprising:

acquiring first preference information stored in advance and representative of a preference of a user, the first preference information indicating a reproduction quality for at least one genre of the contents and at least one type of terminal of the user, said first preference information indicating a separate cost associated with each genre and each type of terminal listed in the first preference information for controlling a network band of the network, wherein the first preference information includes information of a picture quality, image process, sound quality and CPU processing capacity associated with each of the genres and the types of apparatuses listed in the first preference information;

acquiring contents to be reproduced, said contents including a plurality of sub-contents;

adjusting a level of reproduction quality to be used when reproducing the contents acquired based on the first preference information;

reproducing the contents adjusted, by reproducing respective ones of the plurality of sub-contents;

acquiring second preference information representative of a preference of the user for one of the plurality of sub-contents adjusted, said second preference information being based on a reaction of the user which is detected during reproduction of the one of the plurality of sub-contents; and adjusting the contents during the reproducing of the contents, by adjusting a level of reproduction quality to be used when reproducing another one of the plurality of sub-contents based on the second preference information acquired for the one of the plurality of sub-contents.

12. A reproduction apparatus for reproducing layered encoding contents received from a providing apparatus over a network, comprising:

contents acquisition means for acquiring contents to be reproduced, said contents including a plurality of sub-contents;

reproduction means for reproducing the contents acquired by said contents acquisition means, by reproducing respective ones of the plurality of sub-contents;

detection means for detecting first preference information representative of a preference of the user for the contents reproduced by said reproduction means the first preference information indicating a reproduction quality for at least one genre of the contents and at least one type of apparatus of the user, and indicating a separate cost associated with each genre and each type of apparatus listed in the first preference information for controlling a network band of the network, wherein the first preference information includes information of a picture quality, image process, sound quality and CPU processing capacity associated with each of the genres and the types of apparatuses listed in the first preference information;

adjustment means for adjusting a level of reproduction quality to be used when reproducing the contents based on the first preference information detected by said detection means; and second detection means for detecting second preference information representative of a preference of the user for one of the plurality of sub-contents reproduced by said reproduction means, said second preference information being based on a reaction of the user which is detected during reproduction of the one of the plurality of sub-contents, wherein the adjustment means further adjusts the contents during the reproducing of the contents by the reproduction means, by adjusting a level of reproduction quality to be used when reproducing another one of the plurality of sub-contents based on the second preference information detected for the one of the plurality of sub-contents.

13. The reproduction apparatus according to claim 12, further comprising:

meta information acquisition means for acquiring meta information from within the contents acquired by said contents acquisition means, said adjustment means adjusting the contents based on the first preference information and the meta information.

14. A reproduction method implemented on a reproduction apparatus for reproducing layered encoding contents received from a providing apparatus over a network, comprising:

acquiring, at the reproduction apparatus, contents to be reproduced, said contents including a plurality of sub-contents;

reproducing, at the reproduction apparatus, the contents acquired by reproducing respective ones of said plurality of sub-contents;

detecting, at the reproduction apparatus, first preference information representative of a preference of the user for the contents reproduced, the first preference information indicating a reproduction quality for at least one genre of the contents and at least one type of apparatus of the user, and indicating a separate cost associated with each genre and each type of apparatus listed in the first preference information for controlling a network band of the network, wherein the first preference information includes information of a picture quality, image process, sound quality and CPU processing capacity associated with each of the genres and the types of apparatuses listed in the first preference information;

adjusting, at the reproduction apparatus, a level of reproduction quality to be used when reproducing the contents based on the first preference information detected; and detecting, at the reproduction apparatus, second preference information representative of a preference of the user for one of the plurality of sub-contents reproduced, said second preference information being based on a reaction of the user which is detected during reproduction of the one of the plurality of sub-contents; and adjusting, at the reproduction apparatus, the contents during the reproducing of the contents, by adjusting a level of reproduction quality to be used when reproducing another one of the plurality of sub-contents based on the second preference information acquired for the one of the plurality of sub-contents.

15. A computer readable storage medium encoded with computer executable instructions for reproducing layered encoding contents received from a providing apparatus over a network, which when executed by a computer, causes the computer to perform a method comprising:

acquiring contents to be reproduced, said contents including a plurality of sub-contents;

reproducing the contents acquired, by reproducing respective ones of said plurality of sub-contents;

detecting first preference information representative of a preference of the user for the contents reproduced, the first preference information indicating a reproduction quality for at least one genre of the contents and at least one type of apparatus of the user, and indicating a separate cost associated with each genre and each type of apparatus listed in the first preference information for controlling a network band of the network, wherein the first preference information includes information of a picture quality, image process, sound quality and CPU processing capacity associated with each of the genres and the types of apparatuses listed in the first preference information;

adjusting a level of reproduction quality to be used when reproducing the contents based on the first preference information detected; and detecting second preference information representative of a preference of the user for one of the plurality of sub-contents reproduced, said second preference information being based on a reaction of the user which is detected during reproduction of the one of the plurality of sub-contents; and adjusting the contents during the reproducing of the contents, by adjusting a level of reproduction quality to be used when reproducing another one of the plurality of sub-contents based on the second preference information acquired for the one of the plurality of sub-contents.

16. A contents providing system which includes a providing apparatus and a reproduction apparatus, for providing layered encoding contents from the providing apparatus to the reproduction apparatus over a network, comprising:

a storage unit configured to store first preference information representative of a preference of a user, the first preference information indicating a reproduction quality for at least one genre of the contents and at least one type of apparatus of the user, and indicating a separate cost associated with each genre and each type of apparatus listed in the first preference information for controlling a network band of the network, wherein the first preference information includes information of a picture quality, image process, sound quality and CPU processing capacity associated with each of the genres and the types of apparatuses listed in the first preference information;

a selection unit configured to select contents based on the first preference information stored in said storage unit, said contents including a plurality of sub-contents;

a reproduction unit configured to reproduce the contents selected by said selection unit by reproducing respective ones of the plurality of sub-contents;

a detection unit configured to detect second preference information representative of a preference of the user for one of the plurality of sub-contents reproduced by said reproduction unit, said second preference information being based on a reaction of the user which is detected during reproduction of the one of the plurality of sub-contents; and an adjustment unit configured to adjust the contents during the reproducing of the contents by the reproduction means, by adjusting a level of reproduction quality to be used when reproducing the one of the plurality of sub-contents for the user based on the first preference information and adjusting the level of reproduction quality to be used when reproducing another one of the plurality of sub-contents based on the second preference information detected for the one of the plurality of sub-contents.

* * * * *